(12) United States Patent
Billmaier et al.

(10) Patent No.: US 7,055,104 B1
(45) Date of Patent: May 30, 2006

(54) SYSTEM AND METHOD FOR FOCUSED NAVIGATION USING FILTERS

(75) Inventors: James A. Billmaier, Woodinville, WA (US); John M. Kellum, Seattle, WA (US); Dewey Reid, San Rafael, CA (US); Philip Rogan, Bozeman, MT (US)

(73) Assignee: Digeo, Inc., Kirkland, WA (US)

( * ) Notice: Subject to any disclaimer, the term of this patent is extended or adjusted under 35 U.S.C. 154(b) by 544 days.

(21) Appl. No.: 10/113,820

(22) Filed: Mar. 29, 2002

(51) Int. Cl.
*G06F 3/00* (2006.01)
*G06F 13/00* (2006.01)
*G09G 5/00* (2006.01)

(52) U.S. Cl. .................. 715/765; 715/767; 715/810; 715/835; 725/45; 725/47; 725/52

(58) Field of Classification Search ............ 715/738, 715/760, 764, 767, 781, 784, 810, 835; 725/37, 725/39, 44–48, 52, 54
See application file for complete search history.

(56) References Cited

U.S. PATENT DOCUMENTS

| | | | |
|---|---|---|---|
| 5,398,074 A | 3/1995 | Duffield et al. ............ 348/564 |
| 5,524,195 A | 6/1996 | Clanton, III et al. ....... 395/155 |
| 5,602,596 A | 2/1997 | Claussen et al. ........... 348/564 |
| 5,606,374 A | 2/1997 | Bertram .................... 348/565 |
| 5,621,456 A | 4/1997 | Florin et al. .................. 348/7 |
| 5,623,613 A | 4/1997 | Rowe et al. ................ 395/353 |
| 5,663,757 A | 9/1997 | Morales ....................... 348/13 |
| 5,673,401 A | 9/1997 | Volk et al. .................. 395/327 |
| 5,677,708 A | 10/1997 | Matthews, III et al. ..... 345/115 |
| 5,682,511 A | 10/1997 | Sposato et al. ............. 395/353 |
| 5,812,124 A | 9/1998 | Eick et al. .................. 345/327 |
| 5,838,326 A * | 11/1998 | Card et al. .................. 715/775 |
| 5,850,218 A | 12/1998 | LaJoie et al. ............... 345/327 |
| 6,005,565 A * | 12/1999 | Legall et al. ............... 715/721 |
| 6,005,601 A | 12/1999 | Ohkura et al. ................. 348/7 |
| 6,020,930 A | 2/2000 | Legrand .................... 348/569 |
| 6,028,600 A | 2/2000 | Rosin et al. ................ 345/327 |
| 6,037,933 A | 3/2000 | Blonstein et al. ........... 345/327 |
| 6,046,722 A | 4/2000 | McKiel, Jr. ................. 345/145 |
| 6,151,059 A | 11/2000 | Schein et al. ................. 348/13 |
| 6,163,345 A | 12/2000 | Noguchi et al. ............ 348/564 |
| 6,175,362 B1 | 1/2001 | Harms et al. ............... 345/327 |
| 6,188,406 B1 | 2/2001 | Fong et al. ................. 345/348 |
| 6,262,722 B1 | 7/2001 | Allison et al. .............. 345/327 |
| 6,266,059 B1 | 7/2001 | Matthews, III et al. ..... 345/351 |
| 6,266,098 B1 | 7/2001 | Cove et al. ................. 348/563 |
| 6,281,940 B1 | 8/2001 | Sciammarella ............. 348/564 |

(Continued)

FOREIGN PATENT DOCUMENTS

EP   1 028 570 A1   8/2000

OTHER PUBLICATIONS

Nokia Mediaterminal 511S; www.nokia.com/multimedia/pdf/mediaterminal.pdf; pp. 1-12; printed Dec. 11, 2001.

(Continued)

*Primary Examiner*—X. L. Bautista
(74) *Attorney, Agent, or Firm*—Kory D. Christensen; Stoel Rives LLP

(57) ABSTRACT

A sequence of cards representing filters is displayed along a first axis of a user interface with a single card being displayed in a focus area. The card in the focus area defines a selected filter, which is applied to another sequence of available options. The filtered sequence is then displayed along another (perpendicular) axis of the user interface.

48 Claims, 16 Drawing Sheets

U.S. PATENT DOCUMENTS

| | | | |
|---|---|---|---|
| 6,295,062 B1 | 9/2001 | Tada et al. | 345/348 |
| 6,313,851 B1 | 11/2001 | Matthews, III et al. | 345/718 |
| 6,344,880 B1 | 2/2002 | Takahashi et al. | 348/563 |
| 6,425,129 B1 | 7/2002 | Sciammarella et al. | 725/38 |
| 6,470,381 B1 * | 10/2002 | De Boor et al. | 709/217 |
| 6,538,672 B1 * | 3/2003 | Dobbelaar | 715/810 |
| 6,577,350 B1 | 6/2003 | Proehl et al. | 348/564 |
| 6,613,100 B1 * | 9/2003 | Miller | 715/526 |
| 6,642,939 B1 | 11/2003 | Vallone et al. | 345/721 |
| 6,678,891 B1 | 1/2004 | Wilcox et al. | 725/42 |
| 6,690,391 B1 | 2/2004 | Proehl et al. | 345/720 |
| 6,708,172 B1 * | 3/2004 | Wong et al. | 707/10 |
| 6,728,675 B1 | 4/2004 | Maddalozzo, Jr. et al. | 704/258 |
| 6,934,917 B1 | 8/2005 | Lin | 715/811 |
| 2002/0033848 A1 * | 3/2002 | Sciammarella et al. | 345/838 |
| 2002/0056129 A1 | 5/2002 | Blackketter et al. | 725/112 |
| 2002/0070958 A1 | 6/2002 | Yeo et al. | 345/723 |
| 2002/0078440 A1 | 6/2002 | Feinberg et al. | 725/9 |
| 2002/0152474 A1 * | 10/2002 | Dudkiewicz | 725/136 |
| 2003/0001898 A1 | 1/2003 | Bernhardson | 345/786 |
| 2003/0052900 A1 * | 3/2003 | Card et al. | 345/660 |
| 2003/0090524 A1 * | 5/2003 | Segerberg et al. | 345/786 |
| 2003/0093792 A1 * | 5/2003 | Labeeb et al. | 725/46 |

OTHER PUBLICATIONS

Nokia Mediamaster 9470S; http://www.digitv.de/ifa01/nokia9470s.shtml; pp. 1-2; printed Dec. 11, 2001.
U.S. Appl. No. 10/260,738, filed Sep. 30, 2002, Billmaier et al.
U.S. Appl. No. 10/097,174, filed Mar. 12, 2002, Billmaier et al.
U.S. Appl. No. 10/105,088, filed Mar. 22, 2002, Billmaier.
U.S. Appl. No. 10/105,083, filed Mar. 22, 2002, Billmaier.
U.S. Appl. No. 10/097,195, filed Mar. 12, 2002, Billmaier et al.
U.S. Appl. No. 10/108,178, filed Mar. 27, 2002, Billlmaier et al.
U.S. Appl. No. 10/113,889, filed Mar. 29, 2002, Billmaier et al.
U.S. Appl. No. 10/107,601, filed Mar. 27, 2002, Billmaier et al.
U.S. Appl. No. 10/186,209, filed Jun. 27, 2002, Istvan et al.
U.S. Appl. No. 10/186,210, filed Jun. 27, 2002, Billmaier et al.
U.S. Appl. No. 10/230,964, filed Aug. 29, 2002, Istvan et al.
U.S. Appl. No. 10/260,700, filed Sep. 30, 2002, Billmaier et al.
U.S. Appl. No. 10/270,738, filed Sep. 30, 2002, Billmaier et al.
U.S. Appl. No. 10/260,208, filed Sep. 30, 2002, Billmaier et al.
U.S. Appl. No. 10/328,754, filed Dec. 23, 2002, Rappaport et al.
U.S. Appl. No. 10/259,199, filed Sep. 27, 2002, Young et al.
U.S. Appl. No. 10/138,810, filed May 3, 2002, Billmaier et al.
U.S. Appl. No. 10/138,805, filed May 3, 2002, Billmaier et al.
U.S. Appl. No. 10/138,803, filed May 3, 2002, Billmaier et al.
U.S. Appl. No. 10/183,804, filed May 3, 2002, Billmaier et al.
U.S. Appl. No. 60/317,612, Reid et al., filed Sep. 6, 2001.
U.S. Appl. No. 60/324,997, Reid et al., filed Sep. 26, 2001.
U.S. Appl. No. 10/186,094, filed Jun. 29, 2002, Billmaier et al.
U.S. Appl. No. 10/187,118, filed Jun. 29, 2002, Billmaier et al.
U.S. Appl. No. 10/186,095, filed Jun. 29, 2002, Billmaier et al.
U.S. Appl. No. 60/377,627, Billmaier et al., filed May 3, 2002.
U.S. Appl. No. 29/161,708, Nguyen et al., filed Jun. 3, 2002.
U.S. Appl. No. 10/251,366, filed Sep. 20, 2002, Allen et al.
U.S. Appl. No. 10/260.881, filed Sep. 30, 2002, Allen et al.
U.S. Appl. No. 10/320,900, Dec. 16, 2002, Koide et al.
U.S. Appl. No. 10/328,514, filed Dec. 23, 2002, Koide et al.

* cited by examiner

SYSTEM AND METHOD FOR FOCUSED NAVIGATION USING FILTERS

BACKGROUND

1 Field of the Invention

The present invention relates generally to the field of information systems. More specifically, the present invention relates to a system and method for focused navigation using filters.

2. Description of Related Background Art

Recent advances in technology have vastly increased the number of available options within personal computers (PCs), interactive television (ITV) systems, personal digital assistant (PDAs), cellular telephones, and other information systems. For instance, current ITV systems offer hundreds of broadcast channels and a variety of interactive options, including e-mail, videoconferencing, instant messaging, online banking, online purchasing, and so forth.

Unfortunately, despite technological advances, user interfaces for these systems have remained largely unchanged, making navigation through all of the newly available options no easy task. For example, a user of a modern ITV system must scan through potentially hundreds of channels and other options, often by repeatedly pressing a button on a remote control. Such an outdated approach is far too slow and inconvenient to facilitate effective operation of a modern ITV system.

Similar problems exist with PC interfaces. The graphical user interface (GUI) of a modern PC looks remarkably similar to the first GUI developed twenty years ago. Small icons representing user options are arranged in rows and columns on a graphical representation of a desktop. Many of the icons are identical, requiring the addition of text labels as a distinguishing feature. Typically, a user must individually examine each icon and read each label—a time-consuming process that does not lend itself to effective navigation of the numerous options available in a modern PC.

Accordingly, it would be an advancement in the art to provide a user interface that allows for rapid and efficient navigation of a plurality of options without the drawbacks of conventional approaches. In particular, it would be an advancement in the art to provide an interface in which a user need not repeatedly press a button to display each available option, as is often the case with conventional TV or ITV interfaces. Likewise, it would be an advancement in the art to provide an interface in which a user need not scan through an arrangement of multiple icons, as is the case in many conventional PC interfaces.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Reference throughout this specification to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the following description makes particular reference to ITV systems, it should be recognized that the present invention may be used in conjunction with any type of information system in which selectable options may be displayed on a display screen. Examples of such information systems include, but are not limited to, ITV systems, personal computers, and mobile computing devices, such as PDAs, webpads, cellular telephones, and the like.

Figure 1:
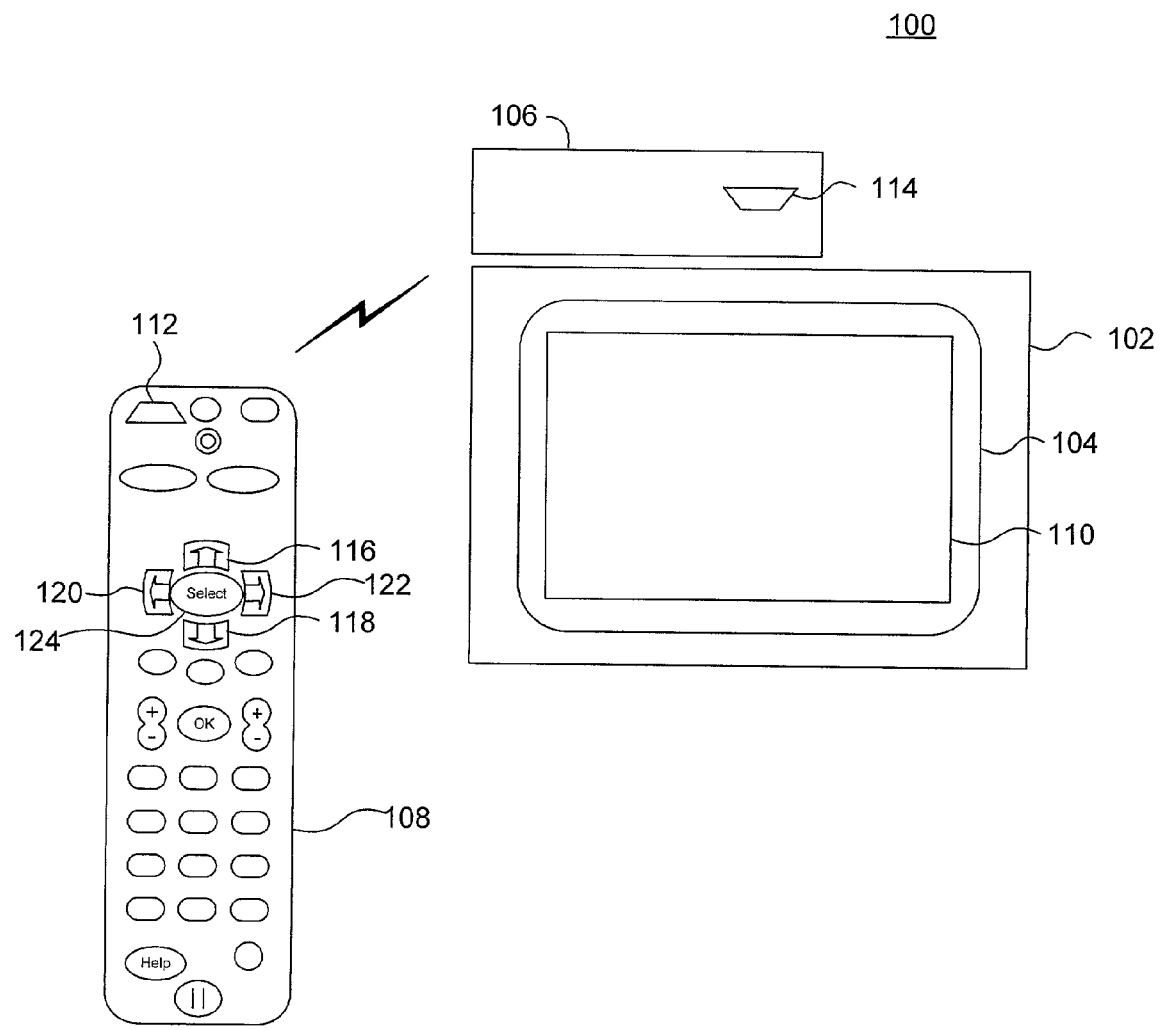
FIG. 1 is a block diagram of an ITV system.

Referring now to FIG. 1, there is shown a block diagram of an ITV system 100 according to an embodiment of the invention. In one configuration, the ITV system 100 includes a television (TV) 102 or other display device having a display screen 104, a set-top box (STB) 106, and a remote control 108.

The STB 106 serves as a gateway between the TV 102 and a broadband communication network (not shown), such as a cable television network or a direct broadcast satellite (DBS) network. One commercially-available example of an STB 106 is the Motorola DCT5000® interactive set-top terminal.

The STB 106 receives encoded television signals and other data from the broadband network and processes the same for display on the display screen 104. The STB 106 may also include hardware and software for presenting a graphical user interface (GUI) 110 on the display screen 104 for operating the various functions and services of the STB 106.

In alternative embodiments, the STB 106 may be integrated into the TV 102, a mobile computing device, or the like. In still other embodiments, the term "STB" may broadly encompass a personal computer (PC) that performs STB-like functions. In such an embodiment, a PC may be used to process TV signals and other data received from the broadband network. The PC may operate in the context of a home network to provide display signals to a variety of devices, including one or more television sets, computer monitors, personal digital assistants (PDAs), cellular phones, and the like. A variety of home networking systems and protocols may be used, such as Ethernet, 802.11b, Bluetooth, etc.

The remote control 108 is provided for convenient remote operation of the STB 106 and the TV 102. The remote control 108 may include a wireless transmitter 112 for transmitting control signals to a wireless receiver 114 within the STB 106 using radio frequency (RF) or infrared (IR) techniques.

In addition, the remote control 108 may include a number of buttons or other similar controls. For instance, the remote control 108 may include a "Up" button 116, a "Down" button 118, a "Left" button 120, a "Right" button 122, and a "Select" button 124. Of course, a variety of other buttons or controls may be provided within the scope of the invention. In alternative implementations, the remote control 108 may be embodied as a keyboard, mouse, or other suitable input device.

As noted, an ITV system 100 typically provides access to a plurality of selectable options, such as channels, programs, applications, digital media files, etc. For instance, an ITV system 100 may provide access to literally hundreds of broadcast TV channels, pay-per-view (PPV) channels, music channels, and the like. Additionally, an ITV system 100 may provide access to a number of interactive channels or applications, including web browsers, e-mail programs, chat clients, personal video recorder (PVR) applications, contact directories, and the like. Furthermore, an ITV system 100 may store or provide access to stored PVR recordings, digital photographs, audio (MP3) files, or other forms of digital media.

Figure 2:
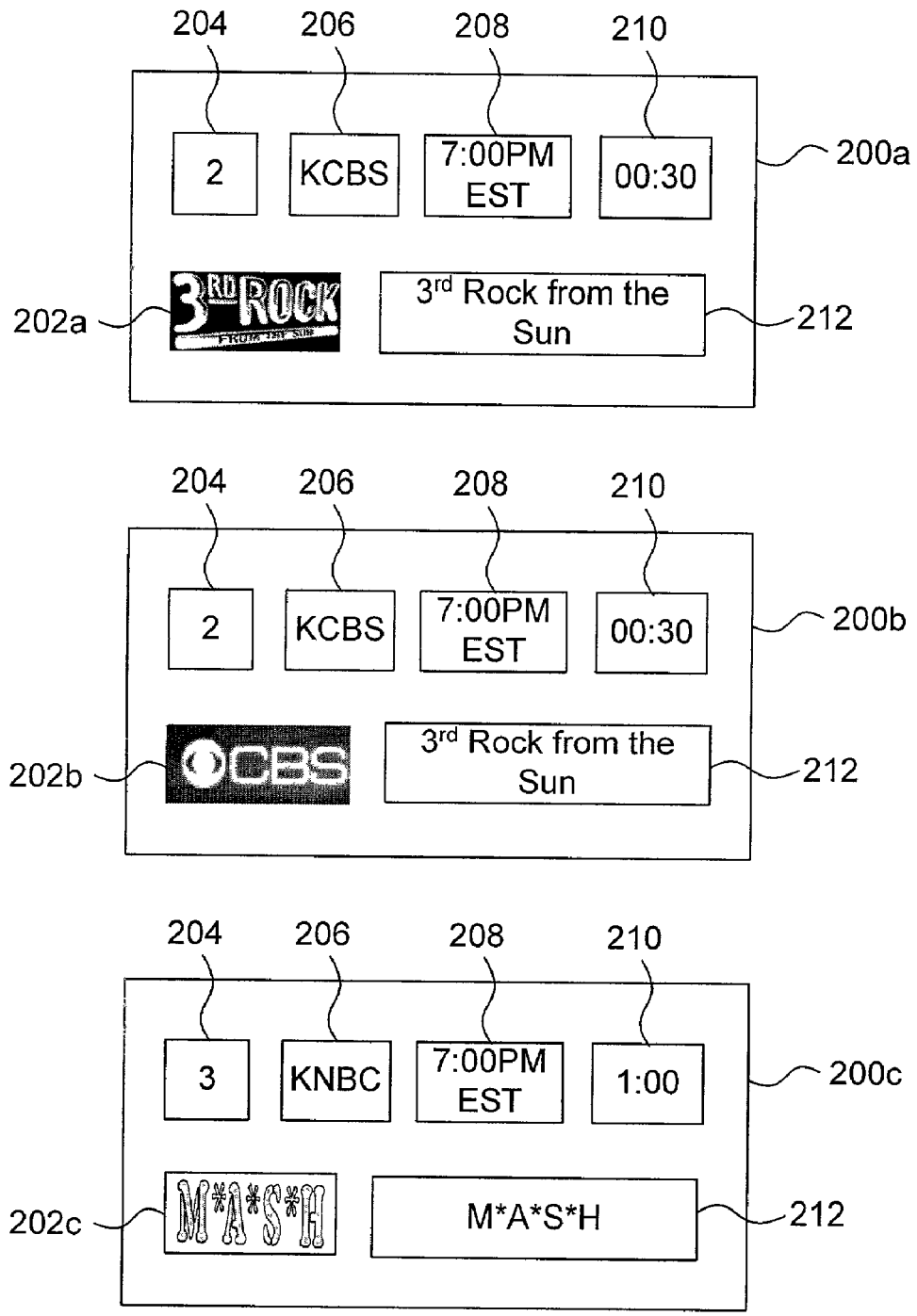
FIG. 2. is an illustration of a plurality of cards.

As shown in FIG. 2, each selectable option within the ITV system 100 may be associated with a card 200. A card 200 is an object or other suitable data structure that provides information about and/or access to an available option within an ITV system 100. A card 200 may be a container of all of the attributes, actions, and/or states needed to facilitate interaction with the option represented thereby. Cards 200 may be stored in any suitable format within a memory or disk drive of the ITV system 100.

Each card 200 may include a graphical representation 202 for display in the GUI 110, as described in detail below. The graphical representation 202 may include various types or combinations of artwork, digital photography, captured video frames, animations, or the like.

As depicted in FIG. 2, cards 200a–c may be used to represent television programs or channels. The television programs may be ongoing (live), upcoming, or previously-recorded. In addition to a graphical representation 202, such cards 200 may include, for instance, a channel number 204, a channel name or identifier 206, a starting time 208, a running time 210, and a text description 212. Of course, cards 200 representing other types of options may include additional or different types of information, such as audio/video clips, file or path names, network addresses (URLs), etc.

The graphical representations 202 associated with cards 200 may have different levels of specificity or granularity. For instance, a graphical representation 202a may correspond generally to a television series, e.g., "3$^{rd}$ Rock from the Sun", while another graphical representation 202b may correspond to a television station or network, e.g., "CBS". In other embodiments, a graphical representation 202 may correspond to a specific episode of a television series (e.g., a series premier), or even a product (purchase opportunity) associated with the television program. In still other embodiments, a generic graphical representation 202 may be provided, which may be overlaid by the channel number 204, text description 212, or other information, where a more specific card 200 is not available.

Cards 200 may be generated locally within an ITV system 100 or may be received via the broadband network using HTTP (hypertext transfer protocol), FTP (file transfer protocol), ATVEF (advanced television enhancement forum) triggers or other well-known protocols or techniques. In one embodiment, a card 200 may be received with data encoded in the vertical blanking interval (VBI) of a television signal. Additionally, information associated with cards 200 (e.g., channel number 204, starting time 208, running time 210) may be dynamically updated with information received in ATVEF triggers.

Figure 3:
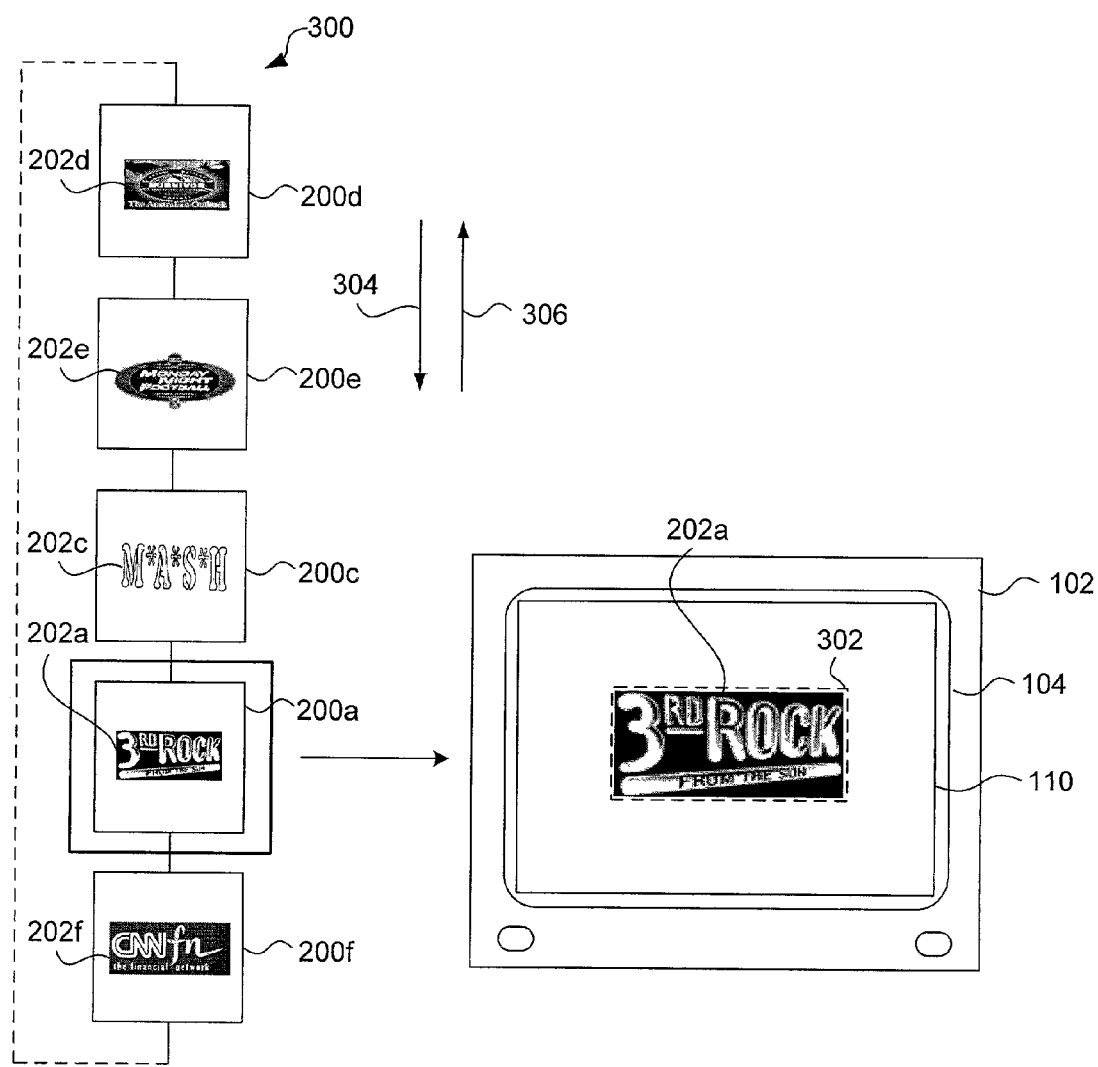
FIGS. 3–10 are illustrations of various techniques for focused navigation of a plurality of options within a user interface.

Referring to FIG. 3, a plurality of cards 200 may be linked or grouped together in a package or sequence 300. The sequence 300 may be circular (as depicted), linear, or configured in other ways. The sequence 300 may be linked in numerical order by channel number 204, in alphabetical order by the text description 212, or in other preset or user-defined ways. For instance, the sequence 300 may be determined based on one or a combination of other inputs, such as user profile information, user preferences, external events or data feeds (e.g., telephone rings, PVR notifications, alerts for external programming sources).

In the illustrated embodiment, one card 200a in the sequence 300 is active or in "focus". As shown, the active card 200a may be displayed within a focus area 302 of a GUI 110 displayed on the TV 102. For brevity, the phrase "displaying a card" refers herein to displaying a graphical representation 202 associated with the card 200. Other information associated with the card, e.g., the channel number 204 or text description 212, may or may not be displayed.

A focus area 302 is a single location of the GUI 110 at which the cards 200 are successively displayed (displayed one at a time in sequence). The focus area 302 may be located at a central or visually dominant location of the GUI 110, although the invention is not limited in this respect. As used herein, the term "focused navigation" refers to a technique of displaying a sequence 300 of cards 200 within a focus area 302.

In response to a single user action, the cards 200 in a sequence 300 are successively displayed within the focus area 302. Where the sequence 300 is circular, the successive display of cards 200 may continue indefinitely until halted by the user by a subsequent action, as described more fully below.

The single user action to initiate navigation may be pressing (or pressing and holding down) a button on the remote control 108. For example, the user may press the "Up" button 116 to initiate the successive display in a first direction within the sequence 300 (indicated by line 304), and press the "Down" button 118 to initiate navigation in the opposite direction (indicated by line 306). Alternatively, the user may speak a command into a microphone (either within the STB 106 or remote control 108) to initiate navigation. Of course, the user may initiate navigation in a variety of other ways within the scope of the invention.

In one embodiment, the sequence 300 of cards 200 is successively displayed at a rate selected by the user. For instance, initially pressing the "Up" button 116 may cause the sequence 300 to be displayed at a rate of two cards 200 per second. As the user continues to hold the "Up" button 116, the rate may increase gradually or in steps to any practical rate within the limit of a typical user's ability to recognize individual cards 200 when they are displayed. Many users are able to recognize individual cards 200 at a rate of seven or more cards 200 per second (420 per minute), facilitating rapid navigation of available options.

The cards 200, when displayed within the focus area 302, may be sufficiently large to permit user recognition from a comfortable viewing distance for the particular display screen 104. Thus, unlike PC icons, which typically occupy as little as 1/200 of the display area of the display screen 104, the displayed cards 200 (and the card 200 in the focus area 302 in particular) may occupy between 1/10 and 1/4 of the total display area.

When the user sees a card 200 being displayed of a channel or option that she desires to select or view, the user may take some additional action and the successive display of cards 200 is halted. For example, where navigation was initiated by pressing and holding down the "Up" button 116, the user may release the "Up" button 116 to discontinue navigation. In an alternative embodiment, where the successive display was initiated simply by pressing a button, the user may press the same or a different button to halt the successive display. Of course, the user may discontinue navigation in a variety of other ways within the scope of the invention.

If the user's reaction time is fast enough, the card 200 representing the desired channel remains displayed in the focus area 302 once navigation is discontinued. However, the user's reaction time may not be fast enough and one or more cards 200 may be subsequently displayed. In such a case, the user may manually backtrack to the desired card 200 by repeatedly activating a suitable control on the remote control 108. For example, briefly pressing the "Up" or "Down" buttons 116, 118 may result in the previous or next card 200, respectively, being displayed. Alternatively, as described in greater detail below, the ITV system 100 may attempt to determine the delay between the user recognizing the desired card 200 and taking the subsequent action and compensate for that delay by reverting to a previously-displayed card 200.

The user may select the channel or option associated with the displayed card 200 by taking a selection action. For instance, the user may press the "Select" button 124 on the remote control 108. Alternatively, the selection action may simply be waiting a set amount of time without activating any controls on the remote control 108.

The effect of activating the card 200 will vary dramatically depending on the type of card 200. For instance, in the case of a card 200 representing a live television program, the GUI 110 may be replaced by a full-size version of the program. Alternatively, activating a card 200 corresponding to a purchase opportunity may result in the display of a web browser directed to a particular website.

Figure 4:
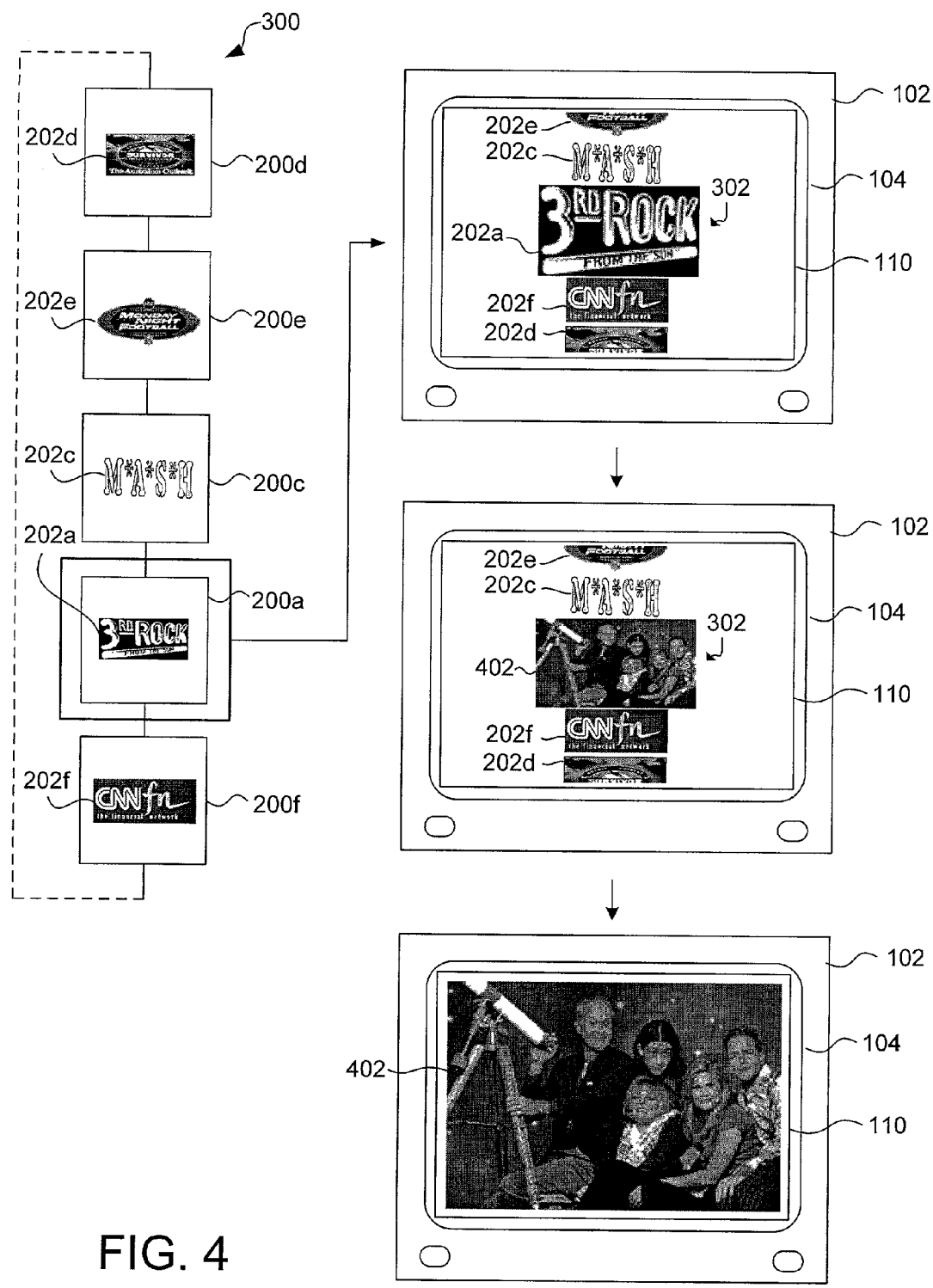

As shown in FIG. 4, one or more previous and next cards 200 within the sequence 300 may be displayed along an axis (not shown) of the GUI 110 to provide the user with a more complete navigational context within the sequence 300. In one embodiment, the axis is an imaginary line that extends across the GUI 110 in a particular direction and intersects the focus area 302. For example, at least a subset of the sequence 300 of cards 200 may be displayed along a vertical axis, with the active card 200a being displayed in the focus area 302. In alternative embodiments, the cards 200 may be displayed along horizontal or diagonal axes, or in other suitable ways.

Typically, one or more cards 200 in a sequence 300 are not displayed. These off-screen or hidden cards may be dynamically changed, replaced, or updated during navigation, e.g., a card 200 representing an advertisement may change from one sponsor to another.

When a user activates one of the navigation buttons of the remote control 108 (e.g., the "Up" or "Down" buttons 116, 118), the displayed cards 200 in the sequence 300 may be scrolled (e.g., shifted or cycled) downward or upward, respectively, with a new card (e.g., card 200c or 202f) entering the focus area 302. Alternatively, the "Left" or "Right" button 120, 122 may be used for the same purpose.

As depicted, the card 200a in the focus area 302 may be visually emphasized in various ways. For example, the card 200a may be enlarged relative to the other displayed cards 200. Alternatively, the card 200a may be animated, marked, illuminated, highlighted, or otherwise set apart from the other cards 200.

In certain embodiments, if the user allows a card 200 representing a live television program to remain in the focus area 302 for a certain amount of time (e.g., 2 seconds), the card 200a may be overlaid by a video window 402 showing the live television program. Furthermore, if the user continues to linger on the card 200a (or if the user presses the "Select" button 124), the video window 402 may be enlarged 402 to fill the entire display screen 104. Other types of cards 200 may exhibit different types of behaviors when the card 200 remains in the focus area 302 for an established period of time.

Where the cards 200 represent live television programs, a card 200 corresponding to the currently-tuned channel (at the current date and time) may be selected by default for display in the focus area 302 each time the GUI 110 is shown. This may occur, for instance, when the user is watching TV and presses a button (such as the "Select" button 124) in order to display the GUI 110. Additionally, an indication of the currently-displayed card 200 in the focus area 302 may be stored in non-volatile memory or otherwise maintained such that if a reset condition occurs (e.g., the STB 106 is rebooted or reset after a power loss, etc.) the last-displayed card 200 may be restored to the focus area 302.

Figure 5:
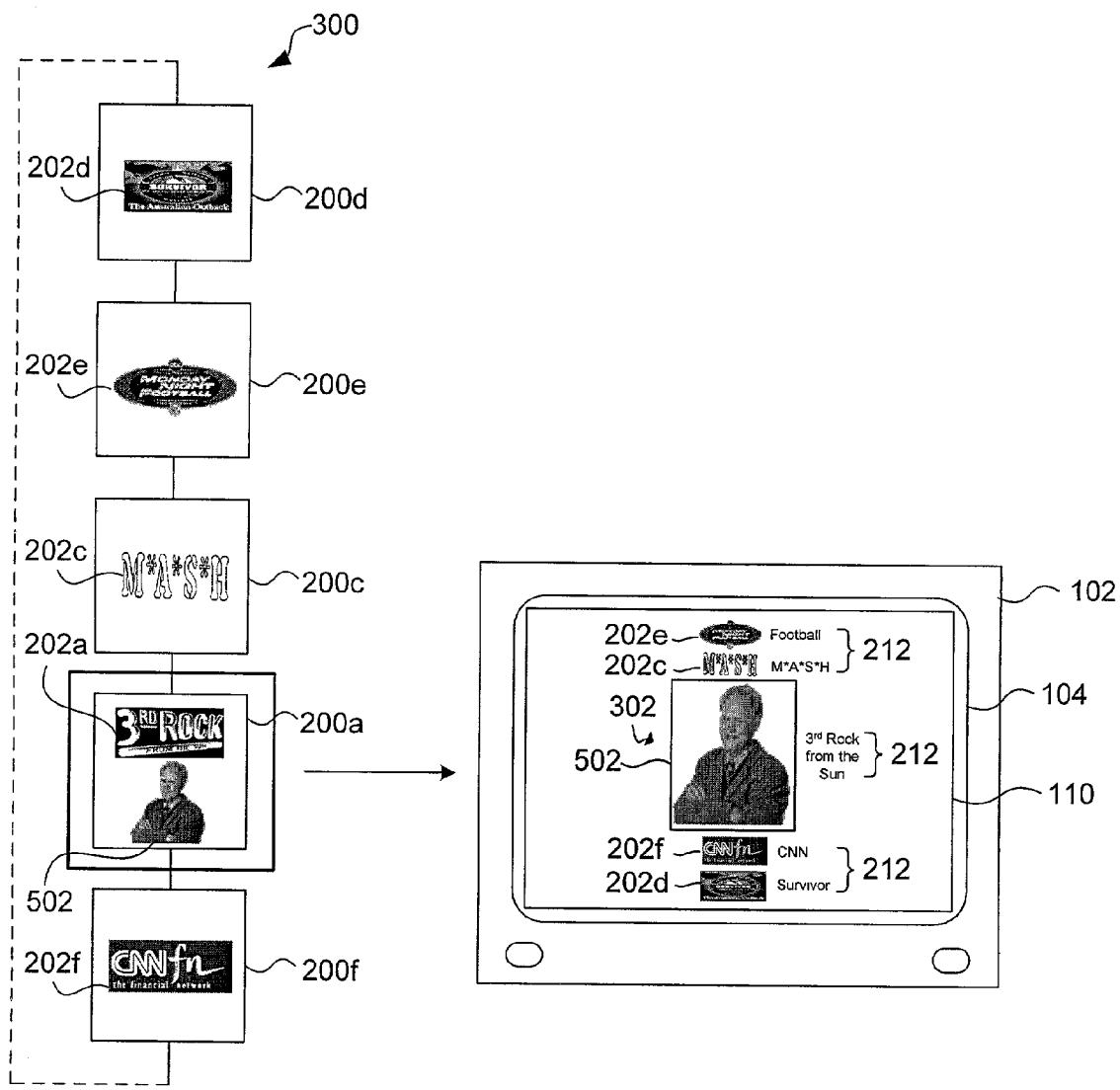

Referring to FIG. 5, cards 200 may include one or more alternative graphical representations 502, which may be displayed when the card 200 enters the focus area 302. As depicted, cards 200c–f displayed outside of the focus area 302 are shown using a first graphical representation 202c–f. However, when the card 200a enters the focus area 302, the alternative graphical representation 502 is shown. Providing an alternative graphical representation 502 allows a designer to provide a more detailed or higher-resolution image for display in the focus area 302, which may be enlarged relative to other graphical representations 202 outside of the focus area 302.

In certain implementations, various types of supplemental information, such as text descriptions 212, may be displayed next to the graphical representations 202, 502 in the GUI 110 to aid the user in identifying and knowing the status of the corresponding options. Sometimes a graphical representation 202 may simply be a picture or logo, which may not be familiar to every user. The addition of a text description 212 is helpful in such cases.

The text description 212 may be displayed above, below, or to the side of the graphical representation 202, 502. Moreover, the text may be of a suitably large size to be easily discernable by the user from a normal viewing distance. During navigation, the text descriptions 212 are shifted or cycled with the corresponding graphical representations 202, 502.

In the depicted embodiment, the text descriptions 212 identify a television programs or series, and are shown to the right of the corresponding graphical representations 202. Of course, many other types of text descriptions 212 may be provided, and different placements or orientations of the text descriptions 212 are contemplated.

Figure 6:
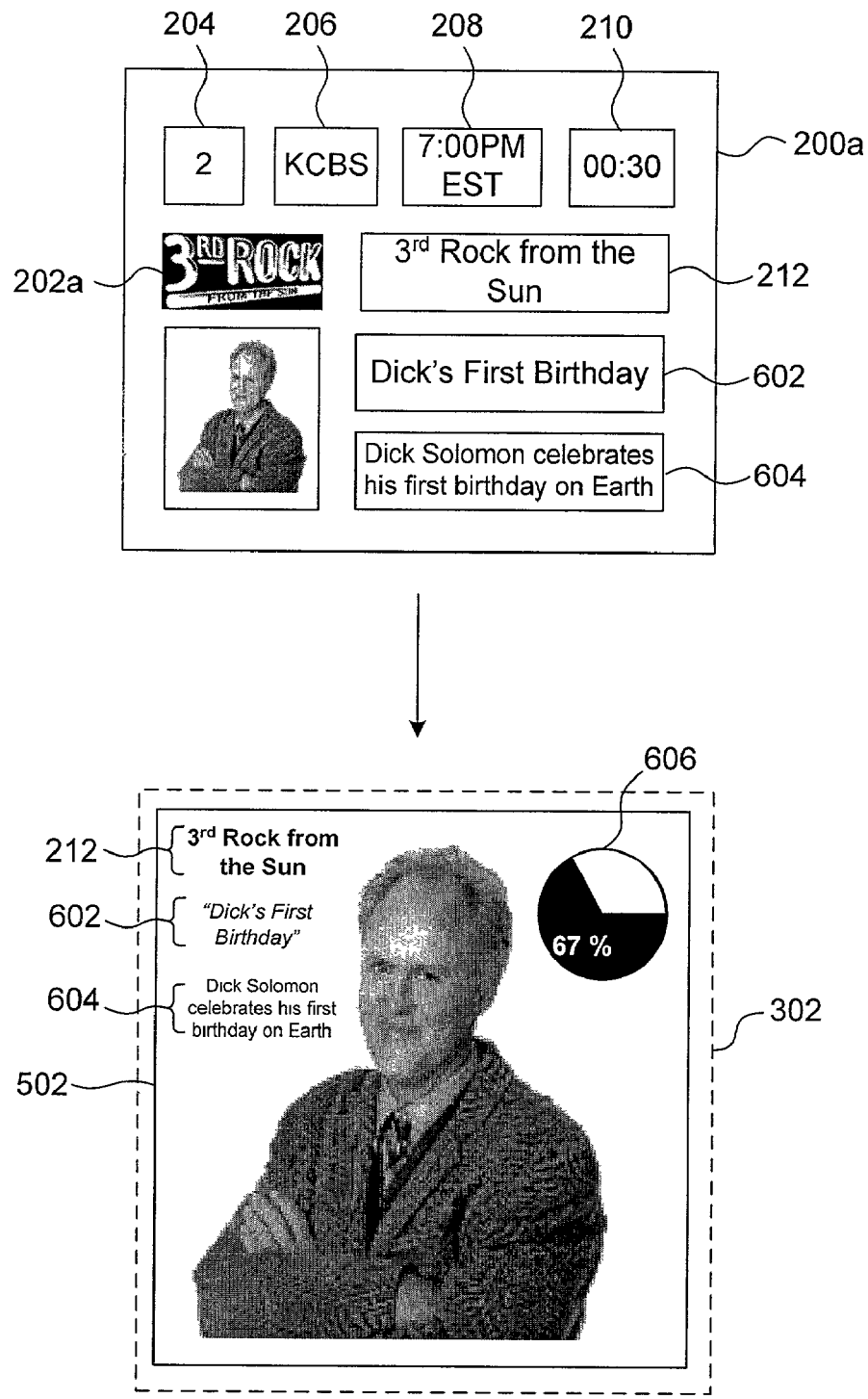

As shown in FIG. 6, a text description 212 may be overlaid or superimposed over a graphical representation 202, 502. This may be accomplished using various techniques, such as configuring a displayed card 200 with multiple graphical "layers", each layer representing either the graphical representation 202, 502, a text description 212, or other display element.

In the depicted embodiment, a card 200 may include or be associated with other types of supplemental information, such as a title 602 and/or synopsis 604, each of which may be likewise superimposed over the graphical representation 502. All such information displayed on or in connection with a card 200 is considered to be within the scope of the invention.

In other embodiments, a program completion indicator 606 may be displayed on or near a graphical representation 202, 502 of a card 200. The program completion indicator 606 graphically (and/or textually) indicates the amount of a live television program that has been missed and/or is left to watch. The indicator 606 may take various forms, such as the pie chart of FIG. 6 or the bar graph of FIG. 7. Additionally, the indicator 606 may include a numerical percentage indicative of the program's completion status. Such an indicator 606 may be valuable to a user in deciding whether to watch a program, particularly where a program is nearing completion.

The ITV system 100 may include a clock (not shown) that maintains an indication of the current time. Based on the starting time 208 associated with a card 200, the ITV system 100 may calculate how much of the program has been missed and generate an appropriate graph and/or text message. For instance, as shown in FIG. 6, if the current time is 7:40 PM, a pie chart may indicate that 67% of "3$^{rd}$ Rock from the Sun" has been missed. In the depicted embodiment, the program completion indicator 606 may be superimposed over the graphical representation 502 as described above.

Figure 7:
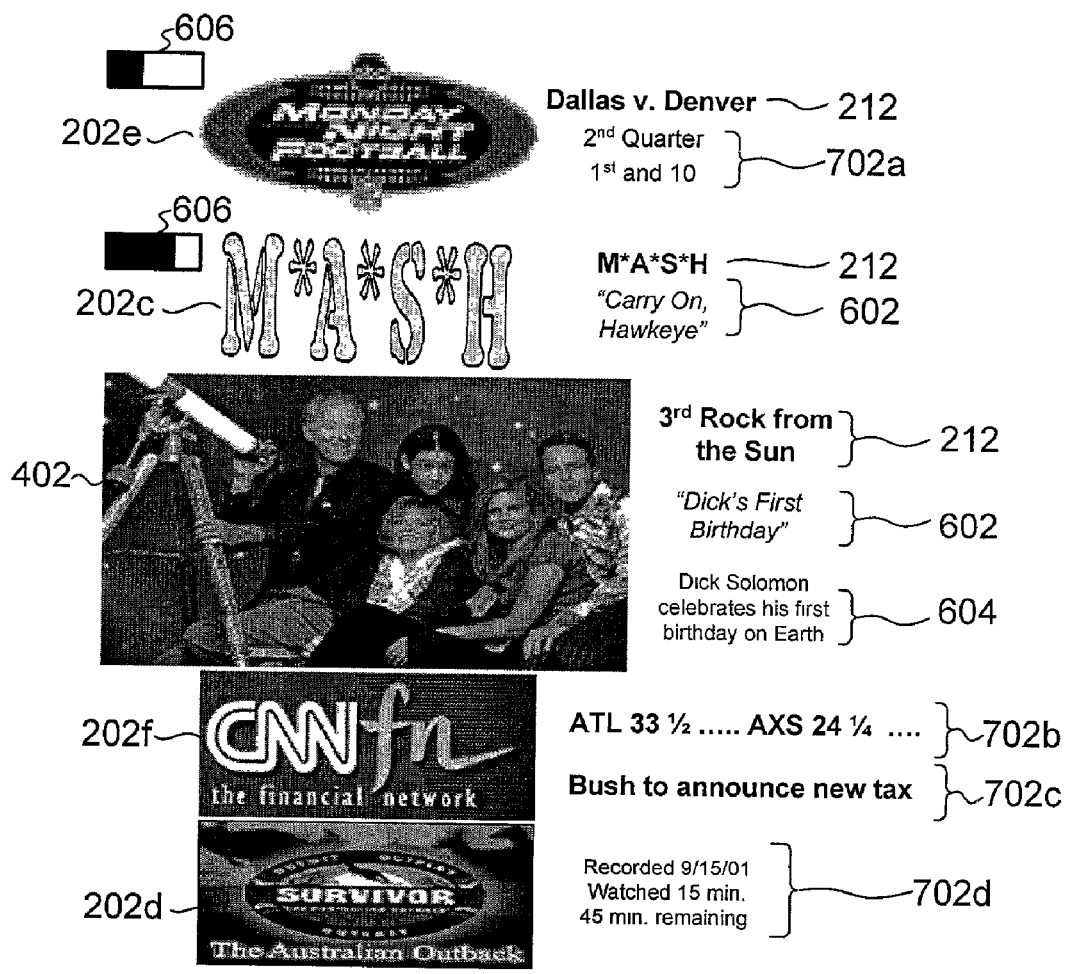

Referring to FIG. 7, a displayed card 200 may be accompanied by an status indicator 702 that provides status information concerning the represented option. For instance, status indicator 702 may relate to the current status (i.e. position, standing, state of affairs, condition, situation) of people, things, or events within an ongoing (live) television program.

For example, during a sporting event, such as a football or baseball game, the status indicator 702a may display the score, field position, down, inning, strike count, clock, etc. In other embodiments, the status indicator 702 may indicate a person being interviewed on a talk show, the current prize level or question in a suitable game show (e.g., "Who Wants to be a Millionaire®"), or a description of an item being currently offered on a shopping channel (e.g., QVC®).

In other embodiments, the status indicator 702 may relate generally to the subject matter of a represented television program and not to any event being currently depicted. For instance, in the case of a card 200 representing CNN/fn®, a status indicator 702b may be embodied as a stock ticker. Alternatively, a status indicator 702c could include a news headline. Similarly, a weather forecast could be shown in connection with a card 200 representing The Weather Channel®.

The status indicator 702 may be generated from information stored within the card 200. For instance, where a sporting event is being tape delayed, score information may be stored within a corresponding card 200, which may then be received by the ITV system 100. Alternatively, where the ITV system 100 already includes a card 200 representing the sporting event, score information within the card 200 may be updated using various techniques, such as ATVEF triggers. In still other embodiments, the ITV system 100 may not store such information within a card 200, but may include a link, such as a URL, to a website from which the information may be retrieved on demand using HTTP or other suitable protocols.

In one configuration, a card 200 may represent a television program recorded by a PVR application with the ITV system 100. The card 200 may include a file or path name (not shown) to a media file stored within a hard disk drive or the like of the ITV system 100. In such an embodiment, the status indicator 702c may indicate when the program was recorded, whether the program has been watched, and/or how much of the program is left to watch.

Of course, a variety of other status indicators 702 may be provided for different types of cards 200 indicating the status of functions, operations, or tasks associated with a represented option. All such status indicators 702 used in connection with cards 200 are considered to be within the scope of the invention.

All of the above-described supplemental information that may be displayed with cards 200, e.g., text descriptions 212, titles 602, synopses 604, program completion indicators 606, status indicators 702, and the like, may be fully user configurable, such that a user may decide whether and how much of such information may be displayed. Moreover, the makeup and organization of displayed sequences 300 of cards may be configured by a user in any suitable manner.

Figure 8:
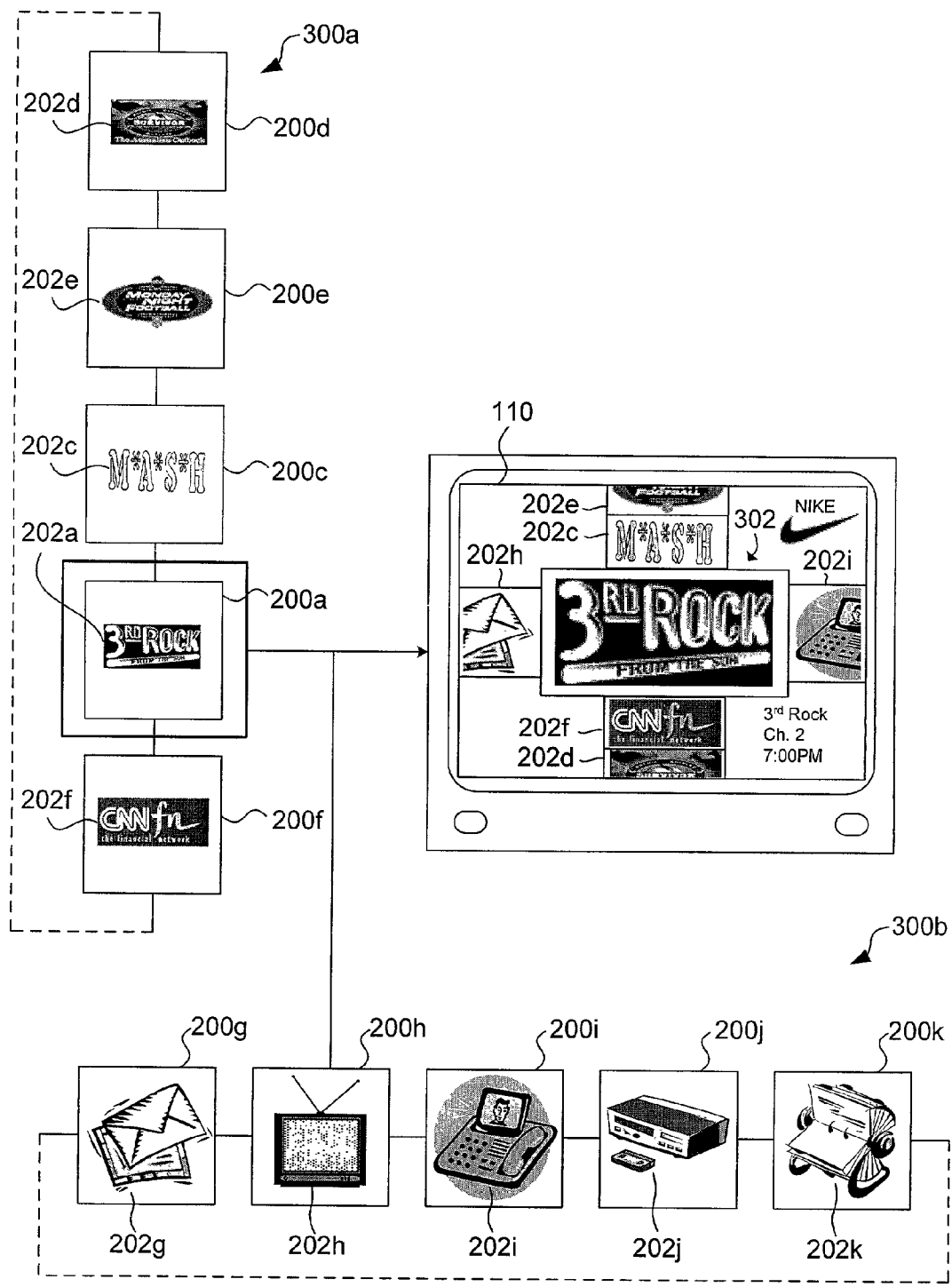

Referring to FIG. 8, multiple sequences 300a–b including different types of cards 200 may be displayed simultaneously. For instance, one or more cards 200 from a sequence 300a representing television programs may be displayed as described in reference to FIG. 4. In addition, one or more cards 200 from a sequence 300b representing interactive channels, applications, or digital media, may also be displayed.

As illustrated, the second sequence 300b may be displayed horizontally, perpendicular to the first sequence 300a, such that the sequences 300a–b intersect at (and define) the focus area 302. Any number of sequences 300 may be displayed on the GUI 110 simultaneously. Of course, the selection of vertical and horizontal for the sequences 300a–b is merely exemplary and not required.

In the depicted embodiment, the "Up" and "Down" buttons 116, 118 may be used to shift or cycle the vertically-displayed sequence 300a within the GUI 110 in order to bring one of the corresponding cards 200a–e into the focus area 302. Likewise, the "Left" and "Right" buttons 120, 122 may be used to shift or cycle the horizontally-displayed sequence 300b to bring one of the corresponding cards 200g–k into the focus area 302.

In one implementation, bringing a card 200 from one sequence 300 into the focus area 302 will determine or change which other sequence 300 is displayed. For example, bringing the card 200h (TV shape) from the horizontal sequence 300b into focus may result in the vertical sequence 300a (television programs) being displayed. Alternatively, bringing the card 200g (envelope shape) into focus may result in a vertical sequence 300 (not shown) corresponding to e-mail messages or contacts. Likewise, bringing the card 200i (videophone shape) into focus may result in a vertical sequence 300 of a videoconferencing buddy list, while the card 200j (VCR shape) may display a vertical sequence 300 of television programs recorded by a PVR. In alternative embodiments, a selection from a vertical sequence 300 may affect which horizontal sequence 300 is displayed.

Figure 9:
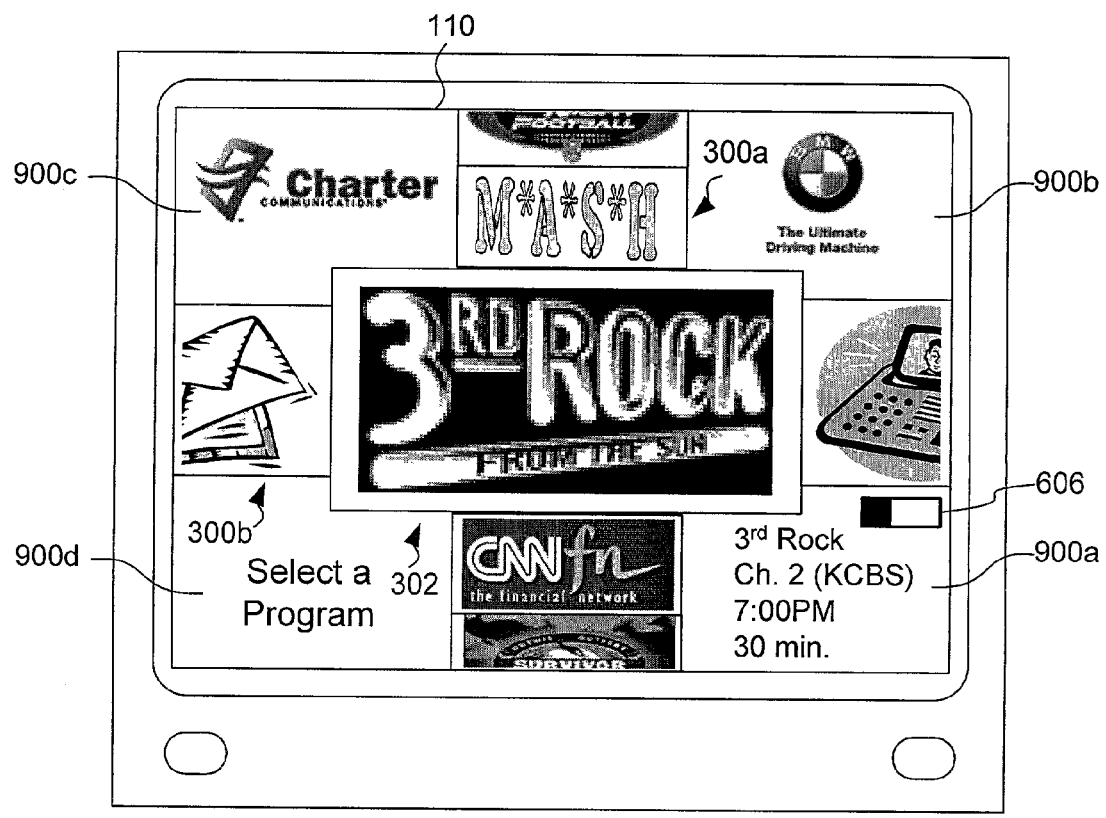

Referring to FIG. 9, a number of context-sensitive areas 900 may be provided within the GUI 110. As depicted, the context-sensitive areas 900 may be quadrants of the GUI 110 formed by the intersection of two displayed sequences 300a–b. Alternatively, the context-sensitive areas 900 may be hemispheres formed by a single sequence 300. However, any number of context-sensitive areas 900 may be provided within the scope of the invention. Unlike the embodiment depicted in FIG. 5, the context-sensitive areas 900 may be in fixed locations outside of the focus area 302 or the area used by the displayed sequences 300a–b.

In one embodiment, a context-sensitive area 900a in a lower-right quadrant of the GUI 100 may display supplemental information (e.g., channel numbers 204, channel identifiers 206, starting times 208, running times 210, text descriptions 212, titles 602, synopses 604, program completion indicators 606, status indicators 702, etc.) related to the card 200 in the focus area 302. The supplemental information may be obtained from the card 200, itself, or retrieved from a network using HTTP, ATVEF triggers, or other suitable techniques.

Additionally, a context-sensitive area 900b in an upper-right quadrant may be used for displaying advertisements related to the card 200 in the focus area 302.

For example, in an episode of "3$^{rd}$ Rock from the Sun" featuring Dick Solomon driving a new BMW®, a suitable graphical image, video clip, flash animation, or the like, may be displayed. The advertisement may be displayed in response to receipt of an ATVEF trigger by the ITV system 100, although other mechanisms may be used within the scope of the invention.

A context-sensitive area 900c in an upper-left quadrant may be used for branding purposes. For instance, as shown in FIG. 9, the context-sensitive area 900c may show a logo for a provider (e.g., cable or satellite) of the television programs represented by the sequence 300a.

Finally, a context-sensitive area 900d in a lower-left quadrant may be used to display system notes and instructional text. For example, where the user is navigating a sequence 300a of cards 200 corresponding to television programs, instructional text may be provided that prompts the user to select a television program. Other uses may include e-mail, videophone, or instant messaging notifications, reminders, warnings, or the like.

The relative sizes of the context-sensitive areas 900 may vary depending, for instance, on the location of the intersection (focus area 302) of the displayed sequences 300a–b. *If the intersection is near the center of the GUI 110, the context-sensitive areas 900 may be equal in size; otherwise, the relative sizes of the context-sensitive areas 900 may vary.*

In alternative embodiments, one or more areas of the GUI 110 may display user-specific or user-targeted information, i.e. customized information for a specific user. The information may be targeted based on a user profile stored within or accessible to the ITV system 100. For instance, the ITV system 100 may be configured to display the BMW advertisement of FIG. 9 if the user profile indicates that a user is a male, age 40 or above, with an income exceeding $150,000 per year. Of course, a variety of other user-specific or user-targeted information may be provided within the scope of the invention.

In certain implementations, a loop of sequentially-displayed supplemental information items may be displayed within one or more of the context-sensitive areas 900 of the GUI 110. For instance, a context-sensitive area 900 may display a sequence of advertisements, news headlines, weather reports, or other information. The individual items may be configured to be displayed at or for certain time periods, as configured by the user or a content producer.

Multiple supplemental information loops may be displayed simultaneously in different context-sensitive areas 900. In such an embodiment, the loops may be synchronized in various ways. For instance, multiple loops may be synchronized in order to not simultaneously display an identical or similar item of supplemental information in two or more context-sensitive areas 900. Likewise, multiple loops may be synchronized such that items of supplemental information may rotate through different context-sensitive areas 900 in a carousel fashion. In this manner, advertising need not always be displayed in the upper-right area 900 of the GUI 110.

Figure 10:
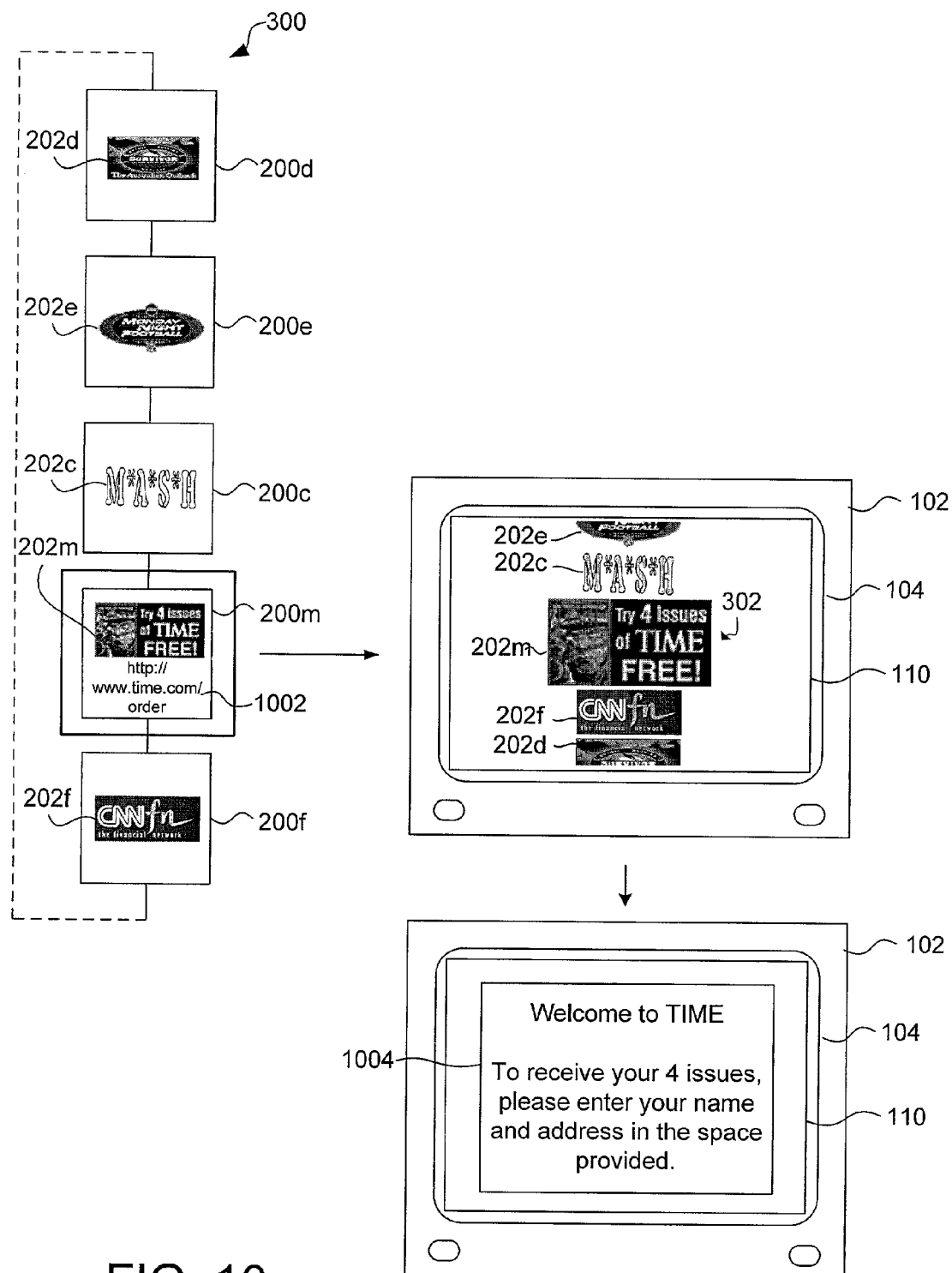

As illustrated in FIG. 10, different types of cards 200 may be included within a single sequence 300. For example, cards 200c–f may correspond to television programs, while card 200m represents a purchase opportunity. In the depicted embodiment, card 200m includes a graphical representation 202m (advertisement), as well as a link or network address 1002, such as a uniform resource locator (URL), to a commercial website.

If the card 200m remains in the focus area 302 for a sufficiently long period, or if the user presses the "Select" button 124, the displayed sequence 300 may be replaced by a web browser 1004, which is automatically directed to the network address 1002 associated with the card 200m. Thereafter, the user may elect to proceed with the purchase opportunity or return to the displayed sequence 300 of cards 200.

Figure 11:
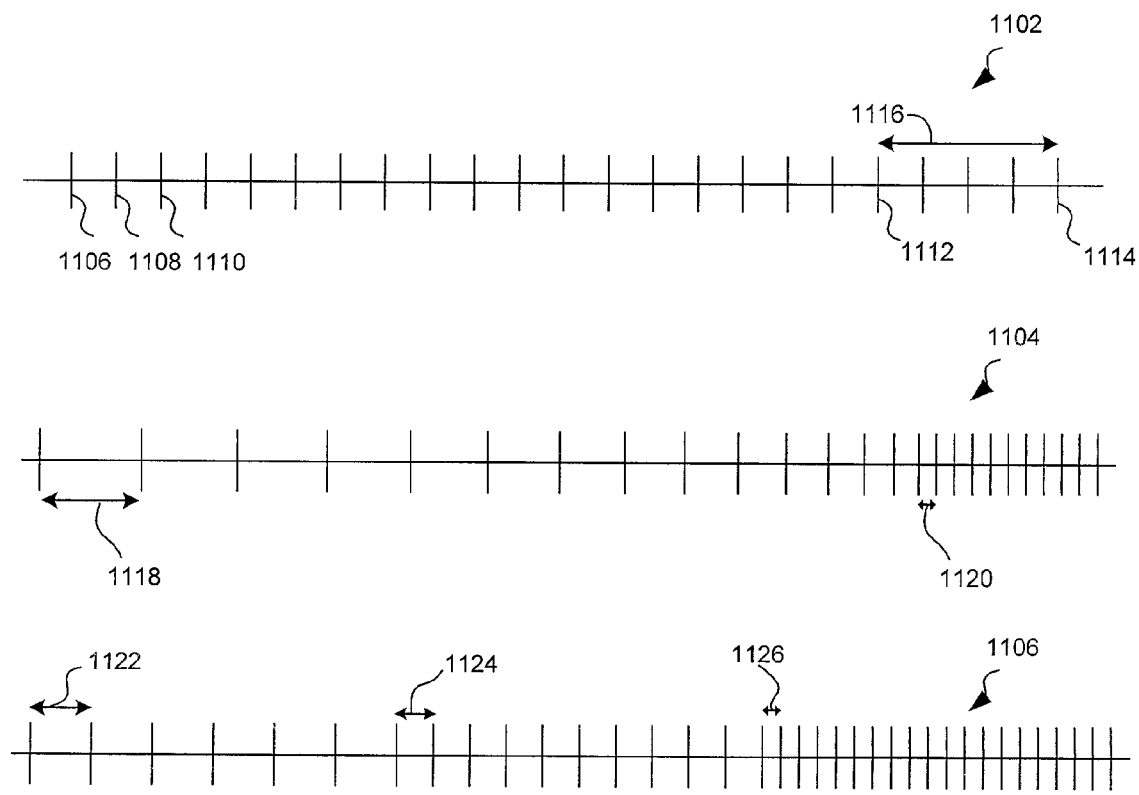
FIG. 11 is a timing diagram for displaying a sequence of cards.

Referring to FIG. 11, there are shown three timing diagrams 1102, 1104, 1106 illustrating the successive display of cards 200 according to embodiments of the invention. Each vertical line within the timing diagrams represents a moment in time at which a particular card 200 is displayed. In diagram 1102, after a single user action, cards 200 are successively displayed at moments 1106, 1108, 1110, and so on. When the user takes some additional action to discontinue navigation, the successive display of cards 200 may be halted at moment 1112.

In certain instances, the user's delayed response may be automatically compensated for by reverting to a previously displayed card 200 once the user halts the successive display. For example, if a card 200 representing a desired channel is displayed within the GUI 110 at moment 1112, but the user takes the additional action to discontinue navigation at moment 1114, the ITV system 100 may be configured to automatically revert to the card 200 displayed a suitable amount of time 1116 before the action was taken. The amount of time may be preset or user-defined, or may be calculated based on historical user reaction times.

The rate at which the cards 200 are successively displayed may be increased in response to the user taking a suitable action. For example, as shown in timing diagram 1104, the rate at which cards 200 are successively displayed may gradually increase from a minimum rate 1118 to a maximum rate 1120 (preferably at or below the user's image recognition limit). Alternatively, as shown in timing diagram 1106, the display rate may increase from a minimum rate 1122 to an intermediate rate 1124 to a maximum rate 1126 according to a stepwise function. The user action to increase the display rate may take many forms, such as holding down a button on the remote control 108 for a set amount of time. In such case, the rate may be increased based on how long the button is held down. Alternatively, the user may increase the display rate by repeatedly pressing a button on the remote control 108, in which case the rate may be increased each time the button is pressed.

Figure 12:
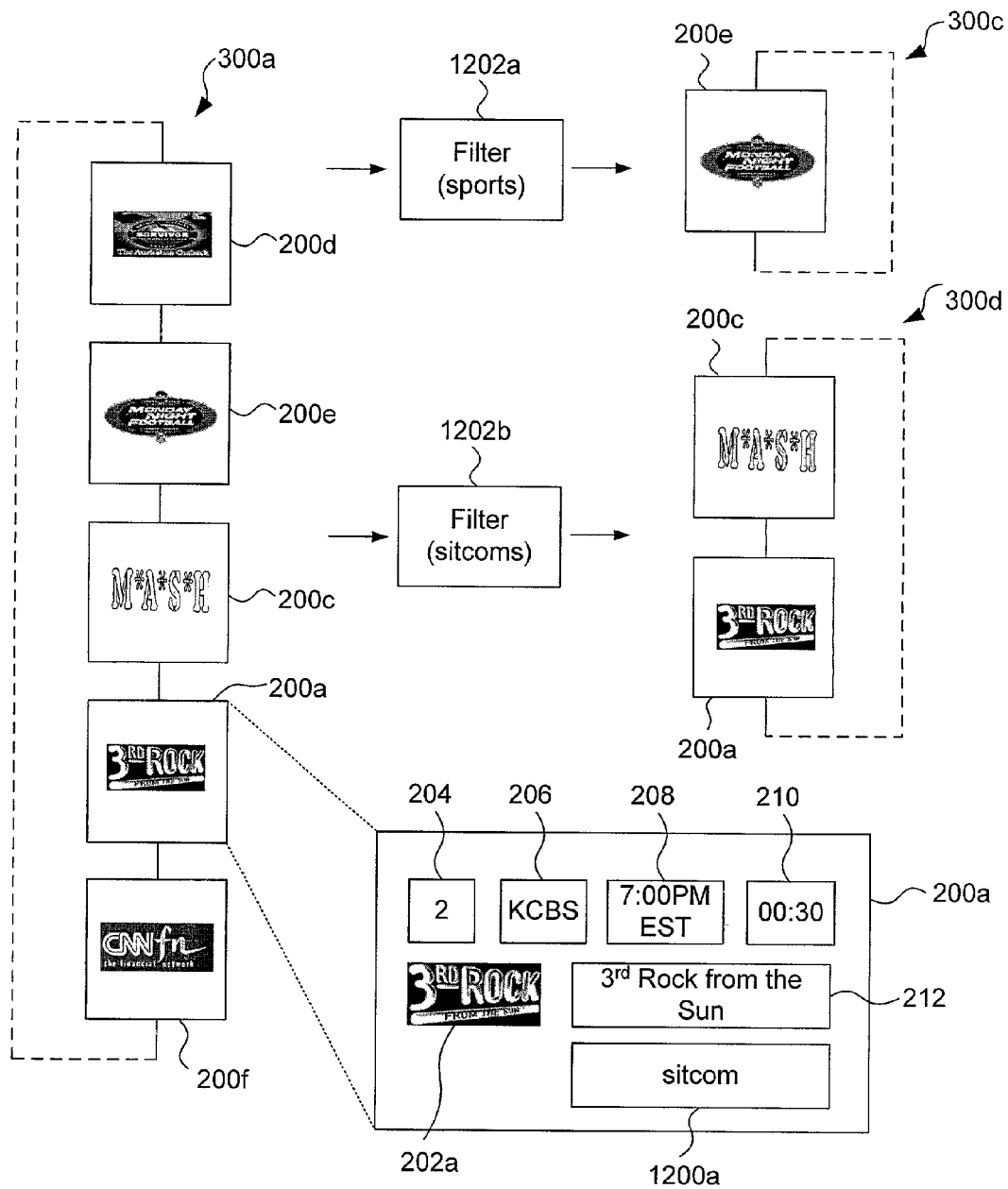
FIG. 12 is an illustration of a technique for filtering sequences of cards.

FIG. 12 illustrates a technique for filtering sequences 300 of cards 200 in order to generate shorter sequences 300 that can be more easily navigated. In many instances, a sequence 300 may include hundreds of cards 200, e.g., a sequence 300 representing all of the television programs being currently broadcast. Accordingly, it would be an advancement to allow a user to filter and thereby reduce a large sequence 300 to a manageable size that can be quickly searched.

As depicted, each card 200 may include one or more tags 1200. A tag 1200 may indicate a genre, type, function, priority, or other characteristic of a card 200 or a represented option. A tag 1200 may be embodied as an XML tag, an object attribute, or other suitable indicator known in the art. As exemplified in FIG. 12, a tag 1200 may indicate a genre of a television program represented by a card 200*a* (e.g., a sitcom).

One or more filters 1202 may be provided for filtering sequences 300 of cards 200 based on the tags 1200. A filter 1202 may be embodied as an object, a module of code, a data structure, a circuit, or other suitable mechanism for performing or assisting with the filtering function as described herein. In one embodiment, a filter 1202 may include criteria, such as one or more search terms (e.g., keywords), search attributes, logical expressions, or the like, that may be compared with the tag(s) 1200 of each card 200 in a sequence 300. If a tag 1200 is compatible with the criteria, the corresponding card 200 may be retained or copied to a new sequence 300; otherwise, the card 200 may be removed or not copied.

Filters 1202 may be predefined for certain popular categories, e.g., sports, movies, or news. Such predefined filters may be initially provided with the ITV system 100 or may be downloaded from a remote server via a broadband network.

Alternatively, filters 1202 may be explicitly defined by a user, e.g., mySports, John's Favorite Movie Channels, etc. Such filters 1202 may be created based on a viewer's answers to a series of questions relating to the viewer's tastes or needs, e.g. "Do you like SciFi?" Additionally, filters 1202 may be implicitly defined based on historical viewing habits or demographics. For instance, a "movies" filter 1202 may be automatically generated where a user typically watches movies. Such user-defined filters 1202 may be created on a per-viewer or per-household basis. To enable per-viewer filtering, viewer's may log into the ITV system 100 to indicate their presence using various standard techniques.

However the filters 1202 are received or generated, one or more filters 1202 may be stored within a memory or storage device of the ITV system 100, such as a random access memory (RAM) or hard disk drive.

As an example, a filter 1202*a* may only select cards 200 from a sequence 300*a* that have a "sports" tag 1200. In one embodiment, the filter 1202*a* produces a new sequence 300*c* that includes the card 200*e* satisfying the filter 1202*a* (e.g., Monday Night Football). Likewise, a filter 1202*b* may only select cards 200 that have a "sitcom" tag 1200. As a result, a new sequence 300*d* may be created that includes cards 200*a* and 200*c* (e.g., 3$^{rd}$ Rock from the Sun and M*A*S*H). In other embodiments, a new sequence 300 is not created, but the original sequence 300*a* is modified by application of the filter 1202.

Figure 13:
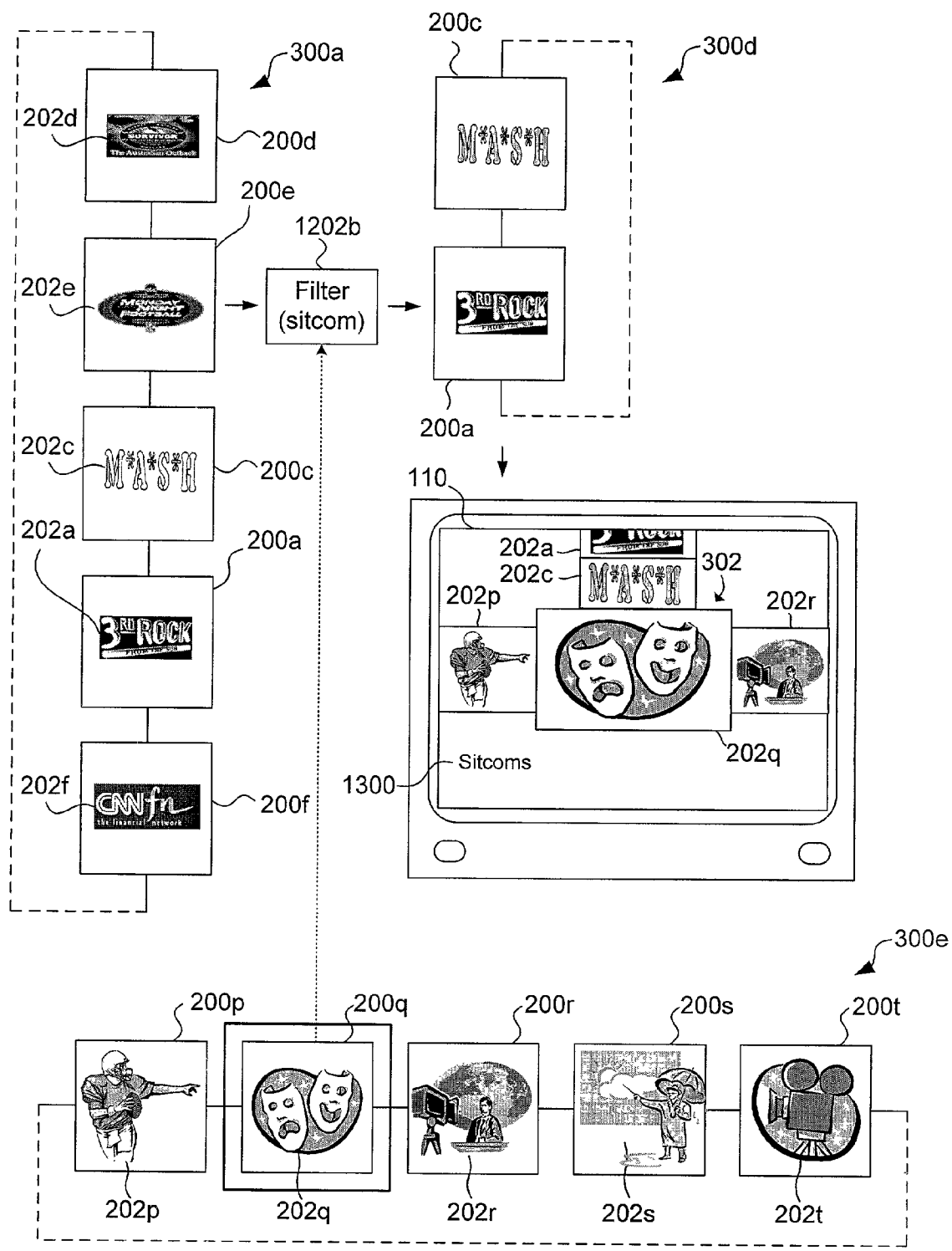
FIG. 13 is an illustration of a sequence of cards representing filters within a user interface.

As illustrated in FIG. 13, cards 200 may be used to represent filters 1202. For instance, a card 200*p* may represent a "sports" filter 1202, while a card 200*q* may represent a "sitcom" filter 1202. The cards 200 representing filters 1202 may be organized into a sequence 300*e*, which may be navigated in the same manner as the other sequences 300 previously discussed. For instance, the cards 200 corresponding to filters 1202 ("filter cards") may be displayed along a horizontal axis of the GUI 110. Accordingly, the sequence 300*e* may be cycled or shifted left or right to bring a new filter card 200 into the focus area 302.

The effect of bringing a filter card 200 into focus may be to apply a corresponding filter 1202 to another sequence 300 of cards, such as the sequence 300*a* representing television programs. For example, selecting the "sitcom" filter card 200 may have the effect of applying the "sitcom" filter 1202*b* to the sequence 300*a*, resulting in a new sequence 300*d* that only includes the cards 200*a* and 200*c* that are compatible with the filter 1202*b*.

The new, filtered sequence 300*d* of cards 200 may then be displayed along the vertical axis of the GUI 110 and may be navigated as previously described. Thus, by selecting the "sitcom" filter card 200 along the horizontal axis, the user is presented with a new sequence 300*d* along the vertical axis corresponding only to sitcoms, rather than the entire sequence 300*a* of available television programs. Of course, the assignment of vertical and horizontal axes in this example is arbitrary, as is the number and configuration of sequences 300.

In one embodiment, a text indication 1300 of the currently-applied filter 1202 may be displayed in the GUI 110, e.g. "Sitcoms". The text indication 1300 may be taken from a text description 212, tag 1200 or the like, associated with the card 200 being currently displayed in the focus area 302.

Figure 14:
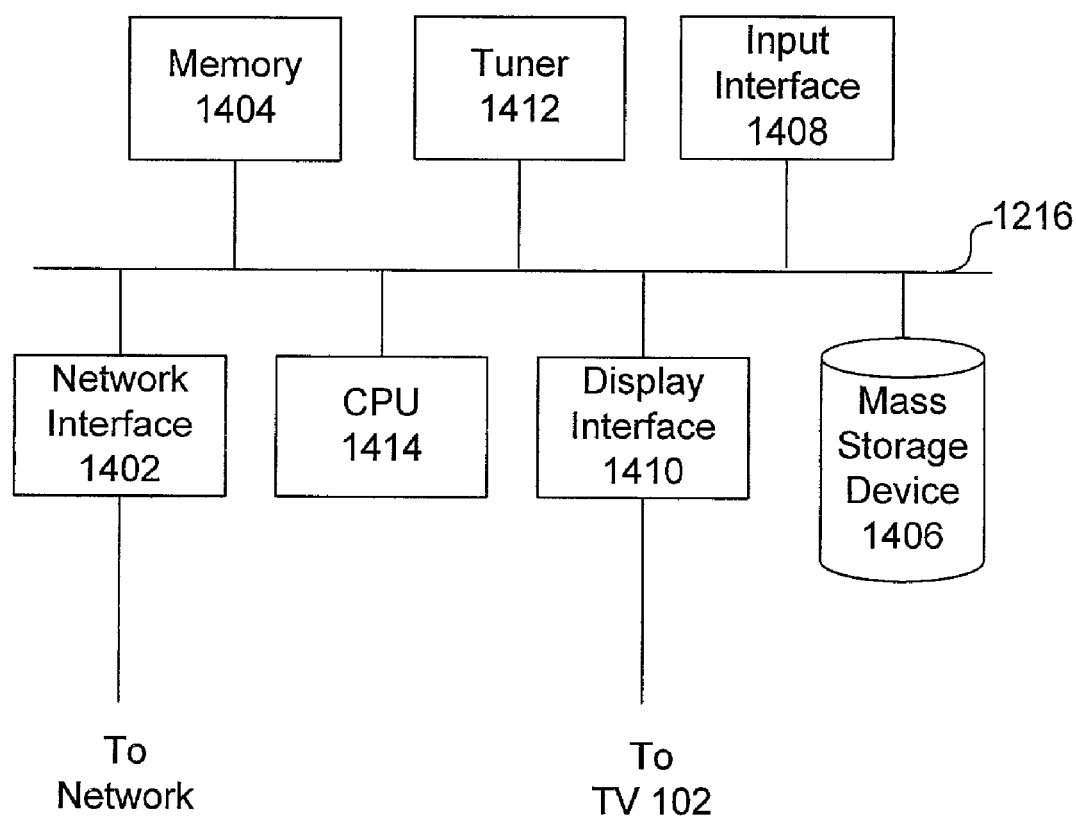
FIG. 14 is a schematic block diagram of a set-top box (STB)

FIG. 14 is a schematic block diagram of an STB 106 according to an embodiment of the invention. The illustrated components may be logical or physical and may be implemented using any suitable combination of hardware, software, and/or firmware.

In one configuration, the STB 106 includes a network interface 1402 for communicating with a broadband network, such as a cable television network or a DBS (Direct Broadcast Satellite) network. The network interface 1402 may conform to the DOCSIS (Data Over Cable Service Interface Specification) or DAVIC (Digital Audio-Visual Council) cable modem standards. Additionally, the network interface 1402 may include standard circuitry for receiving MPEG (Moving Picture Experts Group) streams including multiplexed television programs and data from the broadband network.

One or more sequences 300 of cards 200 may be received by the interface 1402 from a server accessible via the broadband network or the Internet. Additionally, the network interface 1402 may be used to retrieve status indicators 702, such as sports scores, stock tickers, news headlines, and the like, which may be displayed on or near a card 200. Moreover, the network interface 1402 may be configured to receive one or more filters 1202. Such cards 200, indicators 702, and/or filters 1202 may be retrieved via HTTP, ATVEF triggers, or other mechanisms.

The STB 106 further includes a memory 1404, such as a random access memory (RAM) and/or read-only memory (ROM). The memory 1404 may store an operating system (OS) for the STB 106 (e.g., Windows CE® or Linux®), application program code, and various types of data. In one embodiment, the memory 1404 stores one or more sequences 300 of cards 200, as well as data for status indicators 702, filters 1200, and the like. In other embodiments, the sequences 300 may be stored within a mass storage device 1406, such as a hard disk drive, optical storage device, or the like. In certain configurations, the memory 1404 may be further adapted to store one or more filters 1202 for filtering sequences 300 of cards 200, as described in connection with FIG. 14.

An input interface 1408 may be provided for receiving commands from an input device, such as a remote control 108. In one embodiment, the input interface 1408 may include or be associated with the wireless receiver 114 described in connection with FIG. 1. The input interface 1408 may detect a single user action for initiating navigation, such as the user pressing the "Up" or "Down" buttons 116, 118 on the remote control 108.

The STB 106 may further include a display interface 1410 for generating a GUI 110 on an attached TV 102 or other display device. In addition, the display interface 1410 may be responsible for successively displaying cards 200 from one or more stored (and possibly filtered) sequences 300 in a focus area 302 of the GUI 110 in response to the single user action being detected by the input interface 1408. Likewise, the display interface 1410 may be responsible for halting the successive display in response to detection of a subsequent user action. Additionally, the display interface 1410 may be used to display various types of supplemental information on or in connection with cards 200, such as text descriptions 212, program completion indicators 606, status indicators 702, and the like. The display interface 1410 may be adapted to display supplemental information with the corresponding graphical representation 202, 502 using different graphical layers, which are combined to form the card 200 as displayed in the GUI 110.

A tuner 1412 may be included for demodulating and demultiplexing selected MPEG streams received by the STB 106 from the broadband network. The tuner 1412 may be used to tune to a particular television program in response to a user selection of a card 200, e.g., in response to the user pressing the "Select" button 124 or when the user "lingers" on a card 200 in the focus area 302.

A CPU 1414 controls the operation of the STB 106, including the other components described above, which may be in electrical communication with the CPU 1414 via a bus 1416. The CPU 1414 may be embodied as a microprocessor, a microcontroller, a digital signal processor (DSP) or other device known in the art. For instance, the CPU 1414 may be embodied as an Intel® x86 processor. The CPU 1414 may perform logical and arithmetic operations based on program code stored within the memory 1404 or the mass storage device 1406.

Of course, FIG. 14 illustrates only one possible configuration of an STB 106. Those skilled in the art will recognize that various other architectures and components may be provided within the scope of the invention. In addition, various standard components are not illustrated in order to avoid obscuring aspects of the invention.

Figure 15:
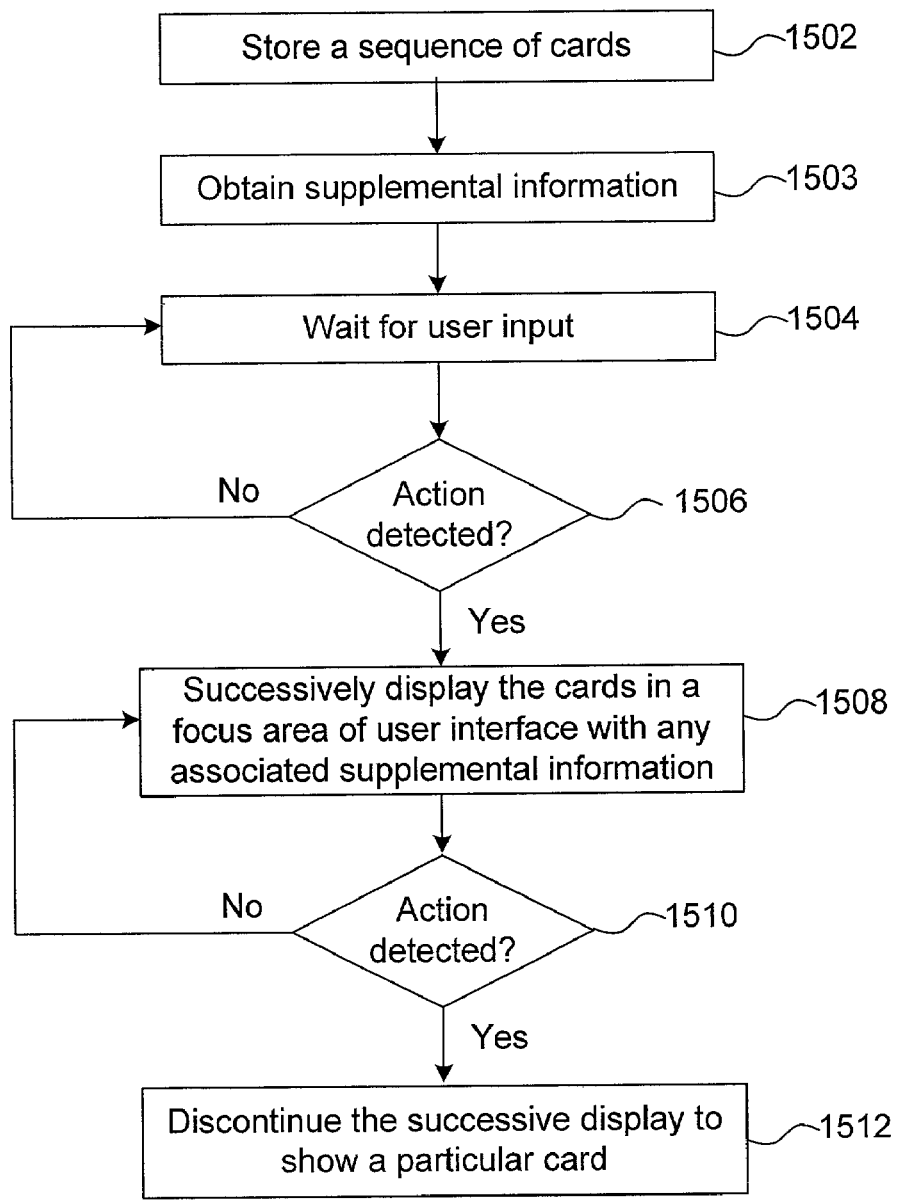
FIG. 15 a flowchart of a method for focused navigation of a plurality of options within a user interface.

Referring to FIG. 15, there is shown a flowchart of a method 1500 for focused navigation of a plurality of options within a GUI 110. The method 1500 begins by storing 1502 a sequence 300 of cards 200 representing channels or other available options within an ITV system 100. Supplemental information not already included within a card 200 may also be obtained 1503, such as a status indicator 702, using HTTP, ATVEF triggers, or other techniques. The supplemental information may be pre-cached by the ITV system 100 prior to the cards 200 being displayed or may be retrieved just in time to be displayed with the corresponding cards 200.

In one configuration, the method 1500 waits 1504 for user input. When a single user action is detected 1506, as previously discussed, the cards 200 from the sequence 300 are successively displayed 1508 in a focus area 302 of the GUI 110. In addition, any supplemental information associated with the cards 200 may also be displayed within or outside of the focus area 302 (e.g., a context-sensitive area 900). This successive display continues until a subsequent user action is detected 1510, at which point the successive display is discontinued and a single card 200 corresponding to a selected option is displayed 1512 within the focus area 302.

Thereafter, depending on the particular type of card 200, various actions may be taken if the user actively selects the card 200 (e.g., presses the "Select" button 124 on the remote control 108) or waits beyond an established time period to either select the card 200, continue navigation, or take some other action. For example, a card 200 in the focus area 302 may be replaced by a video window 402 showing a live television program after a period of inaction (lingering) by the user.

Figure 16:
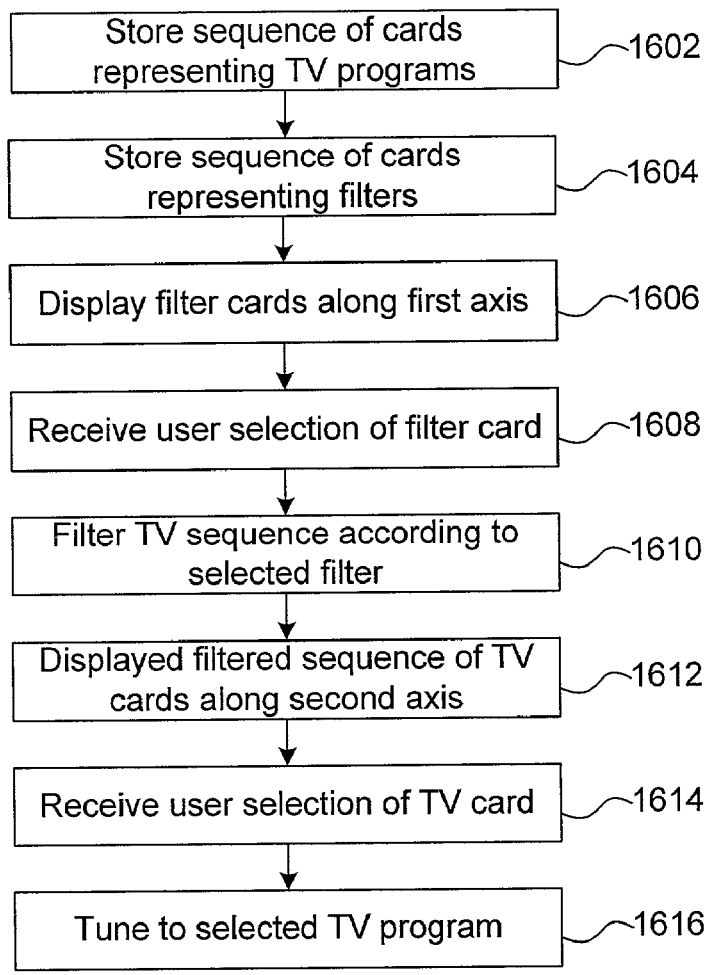
FIG. 16 is a flowchart of a method for focused navigation using filters.

Referring to FIG. 16, there is shown a flowchart of a method 1600 for focused navigation of a plurality of options using filtering. While the embodiment of FIG. 16 relates to the field of interactive television, those skilled in the art will recognize that a wide variety of other applications may be provided within the scope of the invention.

The method 1600 begins by storing 1602 a sequence 300 of cards 200 representing television programs. For instance, the sequence 300 may represent all of the television programs being currently broadcast. Alternatively, the sequence 300 may represent recorded television programs, or programs that are available on demand, e.g., video-on-demand (VoD).

Additionally, a sequence 300 is stored that represents one or more filters 1202, as described above in connection with FIGS. 12–13. The filter cards 200 may be displayed 1606 along a first (e.g., horizontal) axis of the GUI 110, with a single card 200 being displayed within the focus area 302. In one embodiment, the card 200 in the focus area 302 defines the currently-selected filter 1202. Thus, the system may receive 1608 a user selection of a filter 1202 using the navigation techniques described above.

The sequence 300 of cards 200 representing television programs is then filtered 1610 according to the selected filter 1202. For instance, cards 200 may be removed from the sequence 300 that do not satisfy the filtering criteria associated with the selected filter 1202. Alternatively, a new sequence 300 of cards 200 may be created (e.g., copied from a source sequence 300 to a destination sequence 300) that satisfies the filter 1202.

Thereafter, the filtered sequence 300 may be displayed along a second (e.g., vertical) axis of the GUI 110. A user selection of a card from the television sequence 300 may then be obtained 1614, after which the system may tune 1616 to the selected television program.

In view of the foregoing, the present invention offers a number of advantages not available in conventional approaches. Cards representing available channels or options within an ITV system may be successively and rapidly displayed within a focus area. Because navigation is initiated by a single user action, the user need not repeatedly press a button to display each channel, as is often the case with conventional TV or ITV interfaces. This greatly increases navigation speed, reduces wear on the remote control, and reduces the likelihood of discomfort or injury to the user's hand.

Likewise, because the cards are all displayed within a single area of the user interface (i.e. the focus area), the cards may be displayed at a relatively high rate of speed, while still being within the user's image recognition threshold. Typically, the focused navigation technique of the claimed invention allows a user to more quickly and efficiently locate and select a desired option than conventional approaches where a large number of available options exist.

Furthermore, cards may be used to represent filters, which may be applied to large sequences of cards (e.g., sequences representing TV programs) to selectively reduce the sequence to a manageable size. For instance, a user may select a "sports" filter card, which results in only the cards representing sports programs being displayed.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A computer-implemented method for navigating a plurality of options within a user interface, the method comprising:
   providing a first sequence of cards, each card graphically representing an available option;
   providing a user interface including a focus area intersected by a first axis and a second axis, the first axis being perpendicular to the second axis;
   displaying a set of cards representing filters along the second axis;
   receiving a selection of a filter in response to a user scrolling the set of filter cards along the second axis to align a corresponding filter card with the focus area;
   filtering the first sequence of cards according to the selected filter to reduce in number the first sequence of cards to produce a second sequence of cards; and
   displaying at least a subset of the second sequence of cards along the first axis, one card being displayed within the focus area.

2. The method of claim 1, further comprising:
   scrolling the second sequence of cards along the first axis in response to a single user action to progressively change the card within the focus area to a next card in the second sequence; and
   halting the scrolling of cards in response to a subsequent user action to show a selected card from the second sequence within the focus area.

3. The method of claim 1, wherein each filter comprises filtering criteria, and wherein filtering comprises:
   comparing each card in the first sequence to the filtering criteria of the selected filter; and
   copying each card from the first sequence that matches the filtering criteria to the second sequence.

4. The method of claim 3, wherein the filtering criteria comprises one of a search term, a search attribute, and a logical expression.

5. The method of claim 3, wherein each card comprises at least one tag, and wherein comparing comprises:
   comparing the at least one tag of each card to the filtering criteria of the selected filter.

6. The method of claim 5, wherein at least one tag is selected from the group consisting of an XML tag and an object attribute.

7. The method of claim 5, wherein at least one tag indicates a characteristic of a card selected from the group consisting of a genre, a type, a function, and a priority.

8. The method of claim 1, wherein each filter comprises filtering criteria, and wherein filtering comprises:
   comparing each card in the first sequence to the filtering criteria of the selected filter; and
   copying each card from the first sequence that does not match the filtering criteria to the second sequence.

9. The method of claim 1, further comprising:
   storing a third sequence of cards, each card graphically representing a filter.

10. The method of claim 9, wherein the focus area is intersected by a second axis, and wherein receiving a user selection comprises:
    displaying at least a subset of the third sequence of cards along the second axis, one card from the third sequence being displayed within the focus area.

11. The method of claim 10, wherein the selected filter corresponds to the card from the third sequence within the focus area.

12. The method of claim 10, wherein the first axis is perpendicular to the second axis.

13. The method of claim 10, wherein the first axis comprises a vertical axis and the second axis comprises a horizontal axis.

14. The method of claim 10, wherein receiving a user selection further comprises:
    scrolling the third sequence of cards along the second axis in response to a single user action to progressively change the card within the focus area to a next card in the third sequence; and
    halting the scrolling of cards in response to a subsequent user action to show a selected card from the third sequence within the focus area.

15. The method of claim 1, wherein at least one filter is predefined.

16. The method of claim 15, wherein each card in the first sequence represents a television program, and wherein at least one predefined filter is configured to select television programs from a genre selected from the group consisting of sports, movies, and news.

17. The method of claim 1, wherein at least one filter is explicitly defined by a user.

18. The method of claim 1, wherein at least one filter is implicitly defined based on one of historical viewing habits and demographics.

19. The method of claim 1, wherein the at least one filter is received via network.

20. The method of claim 1, wherein each filter comprises filtering criteria, and wherein each filter comprises program code configured to filter the first sequence of cards according to the filtering criteria to produce the second sequence of cards.

21. The method of claim 1, further comprising automatically generating a filter for at least one filter card based on historical viewing selections by the user.

22. The method of claim 1, further comprising automatically generating a filter for at least one filter card based on a user demographics.

23. The method of claim 1, further comprising automatically generating a filter for at least one filter card based on a plurality of survey questions answered by the user.

24. A system for navigating a plurality of options within a user interface, the system comprising:

a memory for storing a first sequence of cards, each card graphically representing an available option, the memory also storing a set of filter cards, each filter card representing a filter for filtering the first sequence of cards to reduce in number the first sequence of cards to produce a second sequence of cards;

a display interface for presenting a focus area intersected by a first axis and a second axis, the first axis being perpendicular to the second axis, at least a subset of the filter cards being displayed along the first axis; and an input interface for receiving a user selection of a filter in response to the at least a subset of filter cards being scrolled along the first axis to align a corresponding filter card with the focus area;

wherein the display interface is to display, in response to selection of a filter, at least a subset of the second sequence of cards along the second axis, one card being displayable within the focus area.

25. The system of claim 24, wherein the selected filter comprises filtering criteria, and wherein the selected filter is further adapted to compare each card in the first sequence to the filtering criteria and copy each card from the first sequence that matches the filtering criteria to the second sequence.

26. The system of claim 25, wherein the filtering criteria comprises one of a search term, a search attribute, and a logical expression.

27. The system of claim 25, wherein each card comprises at least one tag, and wherein the selected filter is further adapted to compare the at least one tag of each card to the filtering criteria.

28. The system of claim 27, wherein at least one tag is selected from the group consisting of an XML tag and an object attribute.

29. The system of claim 27, wherein at least one tag indicates a characteristic of a card selected from the group consisting of a genre, a type, a function, and a priority.

30. The system of claim 24, wherein the selected filter comprises filtering criteria, and wherein the selected filter is further adapted to compare each card in the first sequence to the filtering criteria of the selected filter and copy each card from the first sequence that does not match the filtering criteria to the second sequence.

31. The system of claim 24, wherein the memory is further adapted to store a third sequence of cards, each card graphically representing a filter.

32. The system of claim 31, wherein the focus area is intersected by a second axis, and wherein the display interface is further adapted to display at least a subset of the third sequence of cards along the second axis, one card from the third sequence being displayed within the focus area.

33. The system of claim 32, wherein the selected filter corresponds to the card from the third sequence within the focus area.

34. The system of claim 32, wherein the first axis is perpendicular to the second axis.

35. The system of claim 32, wherein the first axis comprises a vertical axis and the second axis comprises a horizontal axis.

36. The system of claim 32, wherein the display interface is further adapted to scroll the third sequence of cards along the second axis in response to a single user action to progressively change the card within the focus area to a next card in the third sequence and halt the scrolling of cards in response to a subsequent user action to show a selected card from the third sequence within the focus area.

37. The system of claim 24, wherein at least one filter is predefined.

38. The system of claim 37, wherein each card in the first sequence represents a television program, and wherein at least one predefined filter is configured to select television programs from a genre selected from the group consisting of sports, movies, and news.

39. The system of claim 24, wherein at least one filter is explicitly defined by a user.

40. The system of claim 24, wherein at least one filter is implicitly defined based on one of historical viewing habits and demographics.

41. The system of claim 24, further comprising:
a network interface for receiving at least one filter via a network.

42. The system of claim 24, wherein each filter comprises filtering criteria, and wherein each filter comprises program code configured to filter the first sequence of cards according to the filtering criteria to produce the second sequence of cards.

43. A system for navigating a plurality of options within a user interface, the system comprising:
means for providing a first sequence of cards, each card graphically representing an available option;
means for providing a user interface including a focus area intersected by a first axis and a second axis, the first axis being perpendicular to the second axis;
means for displaying a set of cards representing filters along the second axis;
means for receiving a selection of a filter in response to a user scrolling the set of filter cards along the second axis to align a corresponding filter card with the focus area;
means for filtering the first sequence of cards according to the selected filter to reduce in number the first sequence of cards to produce a second sequence of cards; and
means for displaying at least a subset of the second sequence of cards along the first axis, one card being displayed within the focus area.

44. A computer program product comprising a computer-readable medium including program code for performing a method for navigating a plurality of options within a user interface, the method comprising:
providing a first sequence of cards, each card graphically representing an available option;
providing a user interface including a focus area intersected by a first axis and a second axis, the first axis being perpendicular to the second axis;
receiving a selection of a filter in response to a user scrolling the set of filter cards along the second axis to align a corresponding filter card with the focus area;
filtering the first sequence of cards according to the selected filter to reduce in number the first sequence of cards to produce a second sequence of cards; and
displaying at least a subset of the second sequence of cards along the first axis, one card being displayable within the focus area.

45. A computer-implemented user interface for navigating a plurality of options, the user interface comprising:
a focus area;
a first axis intersecting the focus area;
a second axis intersecting the focus area, the second axis being perpendicular to the first axis;
a first sequence of cards displayed along the first axis, each card graphically representing a filter, one card being displayed within the focus area; and a second sequence of cards displayed along the second axis, the second sequence of cards comprising a filtered subset of a third sequence of cards reduced in number based on the filter represented by the card within the focus area.

46. A computer-implemented method for navigating a plurality of television programming options within a user interface of an interactive television system, the method comprising:

storing a first sequence of cards, each card graphically representing an available television programming option;

storing a set of genre filter cards, each genre filter card having an associated genre filter for reducing in number the first sequence of cards according to genre criteria;

providing a user interface including a focus area intersected by a first axis and a second axis, the first axis being perpendicular to the second axis;

receiving a user selection of a particular genre filter card representing a genre filter in response to a user scrolling the set of genre filter cards along the second axis to align the particular genre filter card with the focus area;

filtering the first sequence of cards according to the selected genre filter to reduce in number the first sequence of cards to produce a second sequence of cards;

displaying at least a subset of the second sequence of cards along the first axis, one card being displayed within the focus area;

scrolling the second sequence of cards along the first axis in response to a single user action to progressively change the card within the focus area to a next card in the second sequence; and halting the scrolling of cards in response to a subsequent user action to show a selected card from the second sequence within the focus area.

47. The method of claim 46, further comprising displaying a channel represented by the selected card within the focus area in response to a user command.

48. A computer-implemented method for navigating a plurality of television programming options within a user interface of an interactive television system, the method comprising:

displaying a set of genre filter cards along a first axis of a user interface, one genre filter card being displayable within a focus area of the user interface;

allowing a user to affirmatively select a particular genre filter card within the focus area;

filtering a second sequence of cards representing television programming options according to a genre filter associated with the selected genre filter card to reduce in number the second sequence of cards to produce a third sequence of cards; and displaying at least a subset of the third sequence of cards along a second axis, the second axis being perpendicular to the first axis and intersecting the first axis within the focus area, one card of the third sequence being displayable within the focus area.

* * * * *